US007608961B2

(12) United States Patent
Wise

(10) Patent No.: US 7,608,961 B2
(45) Date of Patent: *Oct. 27, 2009

(54) TORQUE CONVERTER AND SYSTEM USING THE SAME

(75) Inventor: Richard J. Wise, Kelowna (CA)

(73) Assignee: Magnetic Torque International, Ltd, Bridgetown (BB)

(*) Notice: Subject to any disclaimer, the term of this patent is extended or adjusted under 35 U.S.C. 154(b) by 0 days.

This patent is subject to a terminal disclaimer.

(21) Appl. No.: 11/711,099

(22) Filed: Feb. 27, 2007

(65) Prior Publication Data

US 2007/0145844 A1 Jun. 28, 2007

Related U.S. Application Data

(63) Continuation of application No. 11/171,336, filed on Jul. 1, 2005, now Pat. No. 7,233,088, which is a continuation-in-part of application No. 10/758,000, filed on Jan. 16, 2004, now Pat. No. 6,930,421.

(60) Provisional application No. 60/440,622, filed on Jan. 17, 2003.

(51) Int. Cl.
*H02K 49/00* (2006.01)

(52) U.S. Cl. .................. 310/103; 310/112; 310/114

(58) Field of Classification Search ............ 310/103, 310/112, 114, 75 D, 102 R, 156.07, 156.43, 310/156.53, 75 R, 74; 290/40 A–40 C, 4 R, 290/40 R
See application file for complete search history.

(56) References Cited

U.S. PATENT DOCUMENTS

| 1,171,351 | A | 2/1916 | Neuland |
| 1,863,294 | A | 6/1932 | Bogia |
| 2,167,641 | A | 8/1939 | Dewan |
| 2,233,060 | A | 2/1941 | Parvin |
| 2,243,555 | A | 5/1941 | Faus |
| 2,277,214 | A | 3/1942 | Dodge |
| 2,378,129 | A | 6/1945 | Chambers |
| 2,481,172 | A | 9/1949 | Staggs |
| 2,490,789 | A | 12/1949 | Ellis |
| 2,640,166 | A | 5/1953 | Zozulin et al. |
| 2,680,203 | A | 6/1954 | Zozulin et al. |
| 2,722,617 | A | 11/1955 | Cluwen et al. |

(Continued)

FOREIGN PATENT DOCUMENTS

AU 9225377 4/1993

(Continued)

*Primary Examiner*—Tran N Nguyen
(74) *Attorney, Agent, or Firm*—Prass LLP; Stuart I. Smith

(57) ABSTRACT

A torque converter device includes a first body having a first radius and a first thickness, a first plurality of magnets mounted in the first body, the first plurality of magnets including a plurality of magnet pairs, each of the magnet pairs being axially disposed along a centerline of the first body along the first radius through the first thickness, a second plurality of magnets mounted in the first body, each of the second plurality of magnets being disposed between each of the plurality of magnet pairs, and a second body having a third plurality of magnets within the second body for magnetically coupling to each of the magnet pairs and the second plurality of magnets, wherein rotation of the first body induces rotation of the second body.

29 Claims, 23 Drawing Sheets

U.S. PATENT DOCUMENTS

| | | |
|---|---|---|
| 2,754,438 A | 7/1956 | Zozulin et al. |
| 2,768,316 A | 10/1956 | Neiss |
| 2,845,157 A | 7/1958 | Gambell |
| 2,902,612 A | 9/1959 | Whearley |
| 2,949,552 A | 8/1960 | Benoit |
| 2,979,630 A | 4/1961 | Bishop et al. |
| 2,993,159 A | 7/1961 | Devol |
| 3,230,406 A | 1/1966 | Baudot |
| 3,247,407 A | 4/1966 | Bruneel |
| 3,267,310 A | 8/1966 | Ireland |
| 3,331,973 A | 7/1967 | McClure |
| 3,343,833 A | 9/1967 | Fader |
| 3,378,710 A | 4/1968 | Martin, Jr. et al. |
| 3,382,386 A | 5/1968 | Schlaeppi |
| 3,470,406 A | 9/1969 | Law |
| 3,488,535 A | 1/1970 | Baermann |
| 3,510,706 A | 5/1970 | Agaba |
| 3,523,204 A | 8/1970 | Rand |
| 3,531,709 A | 9/1970 | Nazare |
| 3,587,015 A | 6/1971 | Mitchell |
| 3,624,439 A | 11/1971 | Tokutomi |
| 3,645,650 A | 2/1972 | Laing |
| 3,730,488 A | 5/1973 | Gardner et al. |
| 3,731,984 A | 5/1973 | Habermann |
| 3,796,898 A | 3/1974 | Kleinwaechter |
| 3,814,962 A | 6/1974 | Baermann |
| 3,832,581 A | 8/1974 | Hoffmann et al. |
| 3,864,587 A | 2/1975 | Landry |
| 3,869,626 A | 3/1975 | Puttock et al. |
| 3,890,515 A | 6/1975 | Fehr et al. |
| 3,936,683 A | 2/1976 | Walker |
| 3,979,619 A | 9/1976 | Whiteley |
| 4,082,969 A | 4/1978 | Kelly |
| 4,104,552 A | 8/1978 | Tsergas |
| 4,115,040 A | 9/1978 | Knorr |
| 4,167,684 A | 9/1979 | Kelly |
| 4,169,983 A | 10/1979 | Felder |
| 4,196,365 A | 4/1980 | Presley |
| 4,207,487 A | 6/1980 | Beyersdorf |
| 4,267,647 A | 5/1981 | Anderson et al. |
| 4,303,843 A | 12/1981 | Arnoux et al. |
| 4,358,693 A | 11/1982 | Palmer et al. |
| 4,360,753 A | 11/1982 | Shannon |
| 4,405,873 A | 9/1983 | Nondahl |
| 4,456,858 A | 6/1984 | Loven |
| 4,486,176 A | 12/1984 | Tardieu et al. |
| 4,486,675 A | 12/1984 | Albert |
| 4,532,447 A | 7/1985 | Cibié |
| 4,629,921 A | 12/1986 | Gavaletz |
| 4,649,307 A | 3/1987 | Bech |
| 4,651,856 A | 3/1987 | Skrobisch |
| 4,751,486 A | 6/1988 | Minato |
| 4,808,869 A | 2/1989 | Kopp |
| 4,850,821 A | 7/1989 | Sakai |
| 4,866,321 A | 9/1989 | Blanchard et al. |
| 4,869,654 A | 9/1989 | Klaus |
| 4,895,493 A | 1/1990 | Kletschka |
| 4,996,457 A | 2/1991 | Hawsey et al. |
| 5,013,953 A | 5/1991 | Odell |
| 5,117,141 A | 5/1992 | Hawsey et al. |
| 5,158,279 A | 10/1992 | Laffey et al. |
| 5,184,040 A | 2/1993 | Lim |
| 5,191,255 A | 3/1993 | Kloosterhouse et al. |
| 5,193,953 A | 3/1993 | Jesinger |
| 5,204,572 A | 4/1993 | Ferreira |
| 5,214,981 A | 6/1993 | Weinberger et al. |
| 5,304,881 A | 4/1994 | Flynn et al. |
| 5,324,232 A | 6/1994 | Krampitz |
| 5,334,899 A | 8/1994 | Skybyk |
| 5,455,474 A | 10/1995 | Flynn |
| 5,463,263 A | 10/1995 | Flynn |
| 5,477,093 A | 12/1995 | Lamb |
| 5,477,094 A | 12/1995 | Lamb |
| 5,498,919 A | 3/1996 | Balm |
| 5,514,923 A | 5/1996 | Gossler et al. |
| 5,569,111 A | 10/1996 | Cho et al. |
| 5,569,967 A | 10/1996 | Rode |
| 5,594,289 A | 1/1997 | Minato |
| 5,597,119 A | 1/1997 | Gorney et al. |
| 5,619,087 A | 4/1997 | Sakai |
| 5,646,467 A | 7/1997 | Floresta et al. |
| 5,668,424 A | 9/1997 | Lamb |
| 5,672,925 A | 9/1997 | Lipo et al. |
| 5,675,203 A | 10/1997 | Schulze et al. |
| 5,684,352 A | 11/1997 | Mita et al. |
| 5,704,338 A | 1/1998 | Amdersson et al. |
| 5,713,405 A | 2/1998 | Kashiwagi |
| 5,731,649 A | 3/1998 | Caamano |
| 5,739,627 A | 4/1998 | Lamb |
| 5,786,645 A | 7/1998 | Obidniak |
| 5,793,137 A | 8/1998 | Smith |
| 5,814,914 A | 9/1998 | Caamano |
| 5,848,678 A | 12/1998 | Johnston et al. |
| 5,903,082 A | 5/1999 | Caamano |
| 5,917,261 A | 6/1999 | Kawai |
| 5,925,958 A | 7/1999 | Pirc |
| 5,936,321 A | 8/1999 | Kameoka et al. |
| 5,962,942 A | 10/1999 | Pullen et al. |
| 5,982,070 A | 11/1999 | Caamano |
| 5,982,074 A | 11/1999 | Smith et al. |
| 5,986,378 A | 11/1999 | Caamano |
| 5,990,593 A | 11/1999 | Narita et al. |
| 6,025,667 A | 2/2000 | Narita et al. |
| 6,037,696 A | 3/2000 | Sromin et al. |
| 6,047,456 A | 4/2000 | Yao et al. |
| 6,049,197 A | 4/2000 | Caamano |
| 6,054,788 A | 4/2000 | Dombrovski et al. |
| 6,084,322 A | 7/2000 | Rounds |
| 6,140,730 A | 10/2000 | Tkaczyk et al. |
| 6,154,013 A | 11/2000 | Caamano |
| 6,177,745 B1 | 1/2001 | Narita et al. |
| 6,208,053 B1 | 3/2001 | Scott |
| 6,239,524 B1 | 5/2001 | Leibowitz |
| 6,259,233 B1 | 7/2001 | Caamano |
| 6,263,664 B1 | 7/2001 | Tanigawa et al. |
| 6,274,959 B1 | 8/2001 | Uchiyama |
| 6,323,576 B1 | 11/2001 | Applegate |
| 6,373,162 B1 | 4/2002 | Liang et al. |
| 6,407,466 B2 | 6/2002 | Caamano |
| 6,411,001 B1 | 6/2002 | Henderson et al. |
| 6,429,565 B1 | 8/2002 | Matsunobu et al. |
| 6,460,360 B2 | 10/2002 | Hsieh |
| 6,552,460 B2 | 4/2003 | Bales |
| 6,570,824 B1 | 5/2003 | Born |
| 6,605,883 B2 | 8/2003 | Isozaki et al. |
| 6,633,106 B1 | 10/2003 | Swett |
| 6,700,263 B1 | 3/2004 | Kong et al. |
| 6,703,743 B2 | 3/2004 | Kaneko et al. |
| 6,717,324 B2 | 4/2004 | Chen |
| 6,762,526 B2 | 7/2004 | Isozaki et al. |
| 6,789,442 B2 | 9/2004 | Förch |
| 6,794,783 B2 | 9/2004 | Tu et al. |
| 6,803,696 B2 | 10/2004 | Chen |
| 6,841,909 B2 | 1/2005 | Six |
| 6,841,910 B2 | 1/2005 | Gery |
| 6,849,984 B2 | 2/2005 | Gallant |
| 6,867,514 B2 | 3/2005 | Fecera |
| 6,891,306 B1 | 5/2005 | Soghomonian et al. |
| 6,930,421 B2 * | 8/2005 | Wise .................. 310/103 |
| 7,024,963 B2 | 4/2006 | French |
| 7,105,968 B2 | 9/2006 | Nissen |
| 7,145,276 B2 * | 12/2006 | Wise .................. 310/103 |
| 7,233,088 B2 * | 6/2007 | Wise .................. 310/103 |
| 7,268,454 B2 * | 9/2007 | Wise .................. 310/103 |

| | | | | | | |
|---|---|---|---|---|---|---|
| 7,279,818 B1 * | 10/2007 | Wise ................ 310/103 | EP | 0088909 | 9/1983 | |
| 7,279,819 B2 * | 10/2007 | Wise ................ 310/103 | EP | 0655637 | 5/1995 | |
| 7,285,888 B1 * | 10/2007 | Wise ................ 310/103 | EP | 0977343 | 2/2000 | |
| 7,312,548 B2 * | 12/2007 | Wise ................ 310/103 | EP | 0979945 | 2/2000 | |
| 2002/0153795 A1 | 10/2002 | Matsunobu et al. | EP | 1069671 | 1/2001 | |
| 2003/0048033 A1 | 3/2003 | Kobayashi | FR | 2546253 | 11/1984 | |
| 2004/0041479 A1 | 3/2004 | French | GB | 2 094 560 | 9/1982 | |
| 2004/0075358 A1 | 4/2004 | Furuse et al. | GB | 2 216 189 | 10/1989 | |
| 2004/0135453 A1 | 7/2004 | Naito et al. | JP | 60-091011 | 5/1985 | |
| 2004/0150279 A1 | 8/2004 | Wise | JP | 2-250657 | 10/1990 | |
| 2004/0251757 A1 | 12/2004 | Porter, Sr. | JP | 04-185273 | 7/1992 | |
| 2005/0104465 A1 | 5/2005 | Darday | JP | 5-304763 | 11/1993 | |
| 2005/0127767 A1 | 6/2005 | Gallant | JP | 08-336274 | 12/1996 | |
| 2005/0258692 A1 | 11/2005 | Wise | JP | 11-063164 | 3/1999 | |
| 2006/0087187 A1 | 4/2006 | Wise | JP | 2000-197340 | 7/2000 | |
| 2006/0111191 A1 | 5/2006 | Wise | JP | 2004-140937 | 5/2004 | |
| 2006/0123936 A1 | 6/2006 | French | JP | 2005-114162 | 4/2005 | |
| 2006/0226725 A1 | 10/2006 | Wise | JP | 2005-114163 | 4/2005 | |
| 2006/0255676 A1 | 11/2006 | Wise | SU | 1486663 | 6/1989 | |
| 2007/0007835 A1 | 1/2007 | Wise | SU | 1551888 | 3/1990 | |
| | | | WO | 00/21184 | 4/2000 | |
| | | FOREIGN PATENT DOCUMENTS | WO | 00/50719 | 8/2000 | |
| DE | 2631354 | 1/1978 | WO | 00/64031 | 10/2000 | |
| DE | 38 24 619 | 1/1989 | WO | 02/31370 | 4/2002 | |
| DE | 3841012 | 6/1990 | WO | 2006/105617 | 10/2006 | |
| DE | 42 11 740 | 10/1993 | | | | |
| DE | 20007580 | 8/2000 | * cited by examiner | | | |

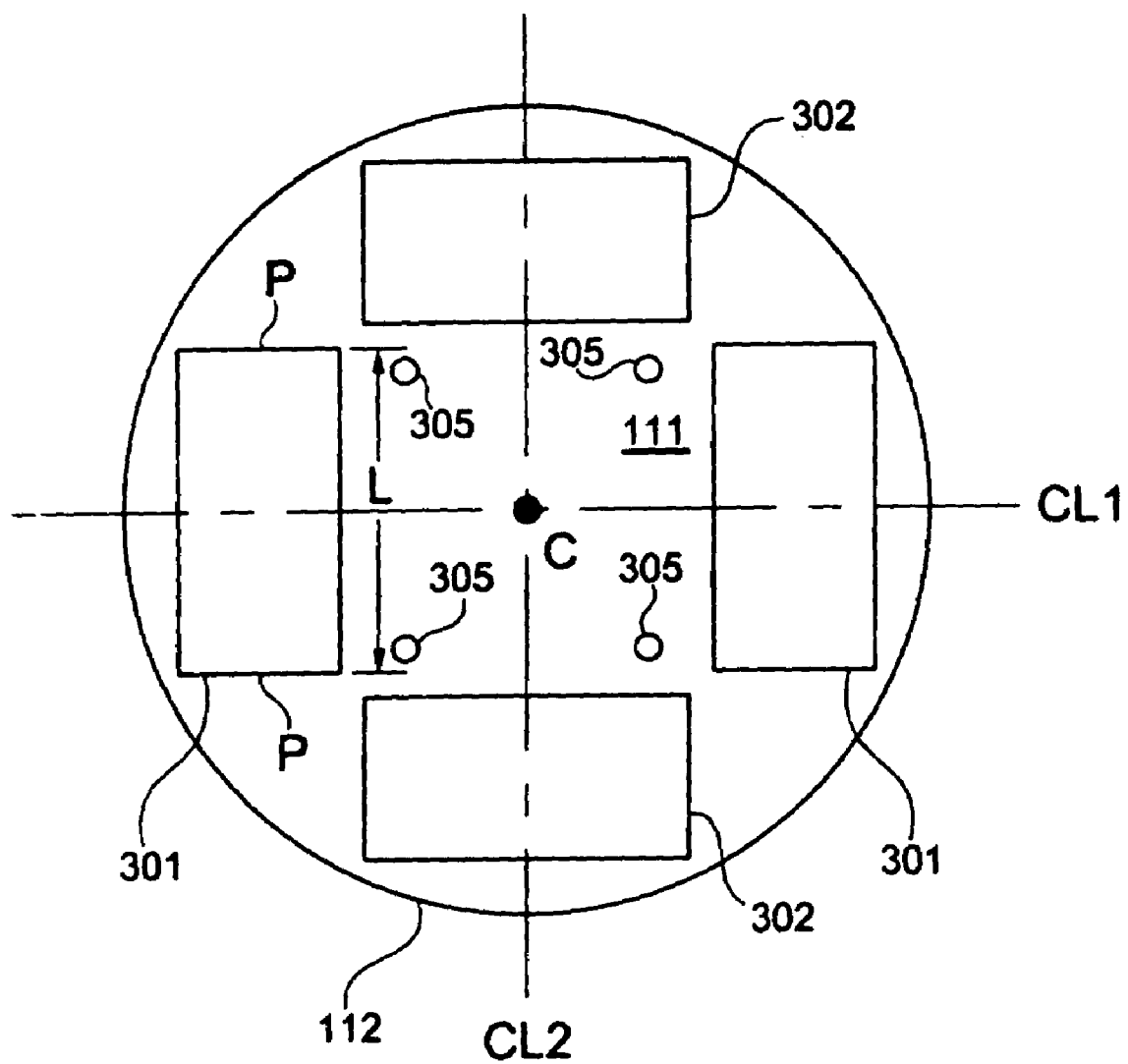

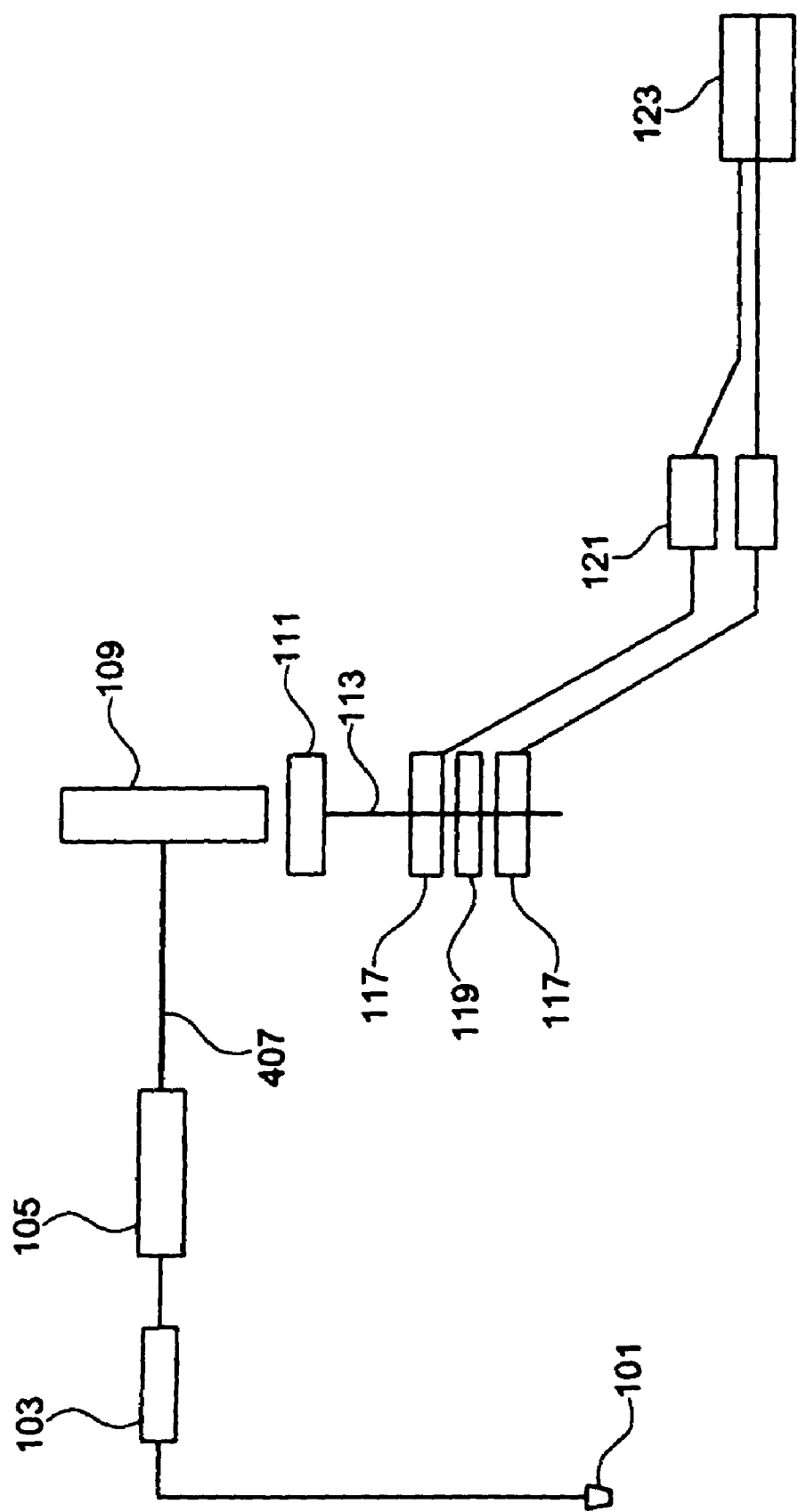

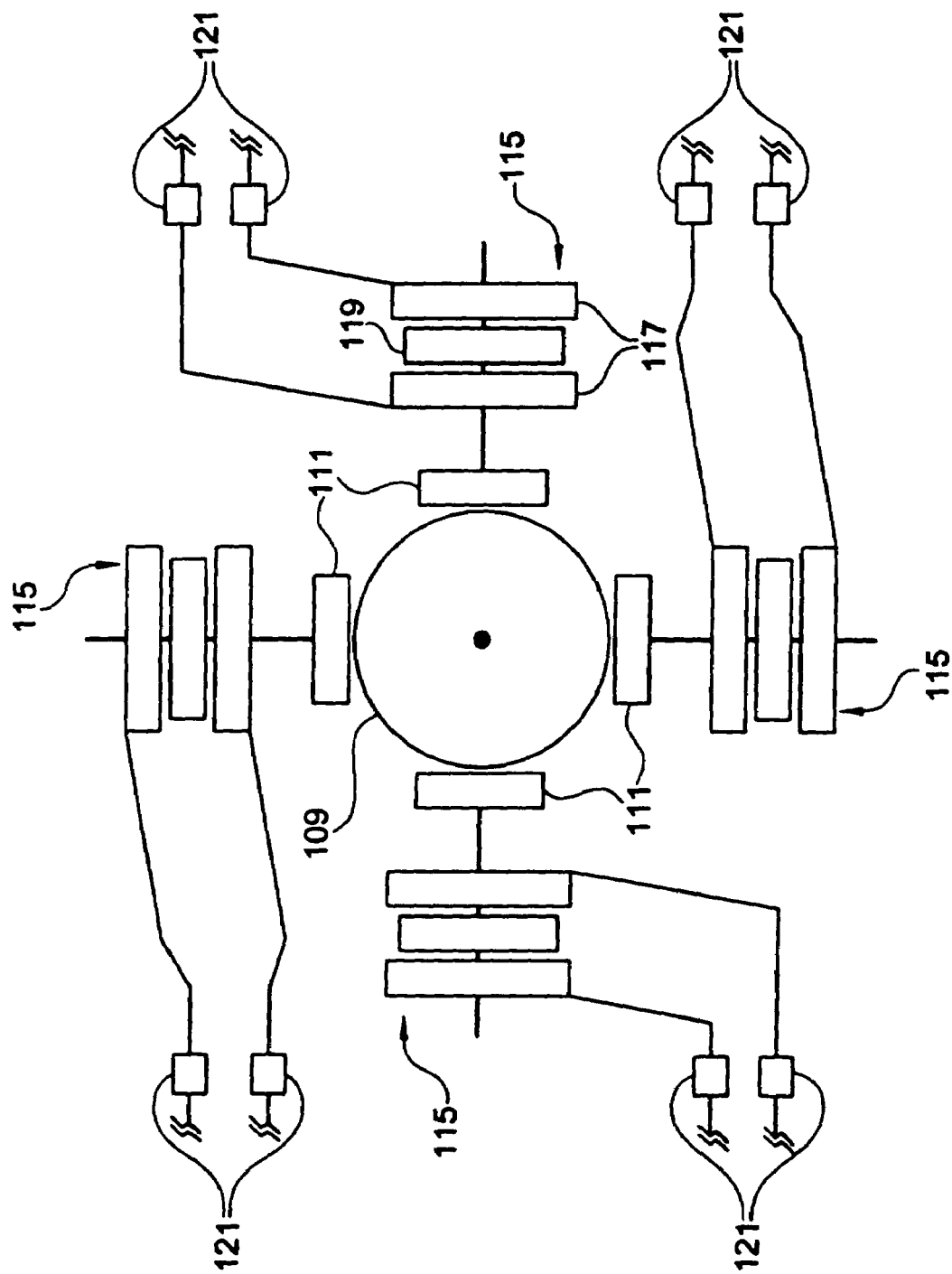

TORQUE CONVERTER AND SYSTEM USING THE SAME

The present application is a Continuation of U.S. patent application Ser. No. 11/171,336 filed on Jul. 1, 2005, now U.S. Pat. No. 7,233,088 which is a Continuation-In-Part of U.S. patent application Ser. No. 10/758,000 filed on Jan. 16, 2004, now U.S. Pat. No. 6,930,421 which claims priority to U.S. Provisional Patent Application No. 60/440,622 filed on Jan. 17, 2003, which is hereby incorporated by reference.

BACKGROUND OF THE INVENTION

1. Field of the Invention

The present invention relates to a torque converter and a system using a torque converter. More specifically, the present invention relates to a torque converter that is capable of multiplying a given torque input based upon compression and decompression of permanent magnetic fields. In addition, the present invention relates to a system that uses a torque converter.

2. Discussion of the Related Art

In general, torque converters make use of mechanical coupling between a generator disk and a flywheel to transmit torque from the flywheel to the generator disk. However, due to frictional forces between the generator disk and the flywheel, some energy provided to the generator disk is converted into frictional energy, i.e., heat, thereby reducing the efficiency of the torque converter. In addition, the frictional forces cause significant mechanical wear on all moving parts of the torque converter.

SUMMARY OF THE INVENTION

Accordingly, the present invention is directed to a torque converter that substantially obviates one or more of the problems due to limitations and disadvantages of the related art.

An object of the present invention is to provide a torque converter having an increased output.

Another object of the present invention is to provide a system using a torque converter that reduces frictional wear.

Another object of the present invention is to provide a system using a torque converter that does not generate heat.

Another object of the present invention is to provide a system using a torque converter than does not have physical contact between a flywheel and a generator disk.

Another object of the present invention is to provide a system using a torque converter that allows an object to be inserted or reside between a flywheel and a generator disk.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a torque converter device includes a first body having a first radius and a first thickness, a first plurality of magnets mounted in the first body, the first plurality of magnets including a plurality of magnet pairs, each of the magnet pairs being axially disposed along a centerline of the first body along the first radius through the first thickness, a second plurality of magnets mounted in the first body, each of the second plurality of magnets being disposed between each of the plurality of magnet pairs, and a second body having a third plurality of magnets within the second body for magnetically coupling to each of the magnet pairs and the second plurality of magnets, wherein rotation of the first body induces rotation of the second body.

In another aspect, an electrical power generating system includes a rotational motion source, a first body having a first radius and a first thickness, the first body coupled to the rotational motion source, a first plurality of magnets mounted in the first body, the first plurality of magnets including a plurality of magnet pairs, each of the magnet pairs being axially disposed along a centerline of the first body along the first radius through the first thickness, a second plurality of magnets mounted in the first body, each of the second plurality of magnets being disposed between each of the plurality of magnet pairs, and a second body having a third plurality of magnets within the second body for magnetically coupling to each of the magnet pairs and the second plurality of magnets such that rotational motion of the first body about a first axis induces rotational motion of the second body about a second axis, wherein the second body is coupled to at least one electrical generator.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings:

FIG. 8A is a layout diagram of an exemplary generator disk according to the present invention;

FIG. 17 is a schematic diagram of an exemplary system using the torque converter according to the present invention; and FIG. 18 is a schematic diagram of another exemplary system using the torque converter according to the present invention.

DETAILED DESCRIPTION OF THE PREFERRED EMBODIMENTS

Reference will now be made in detail to the illustrated embodiments of the present invention, examples of which are illustrated in the accompanying drawings.

Figure 1A:
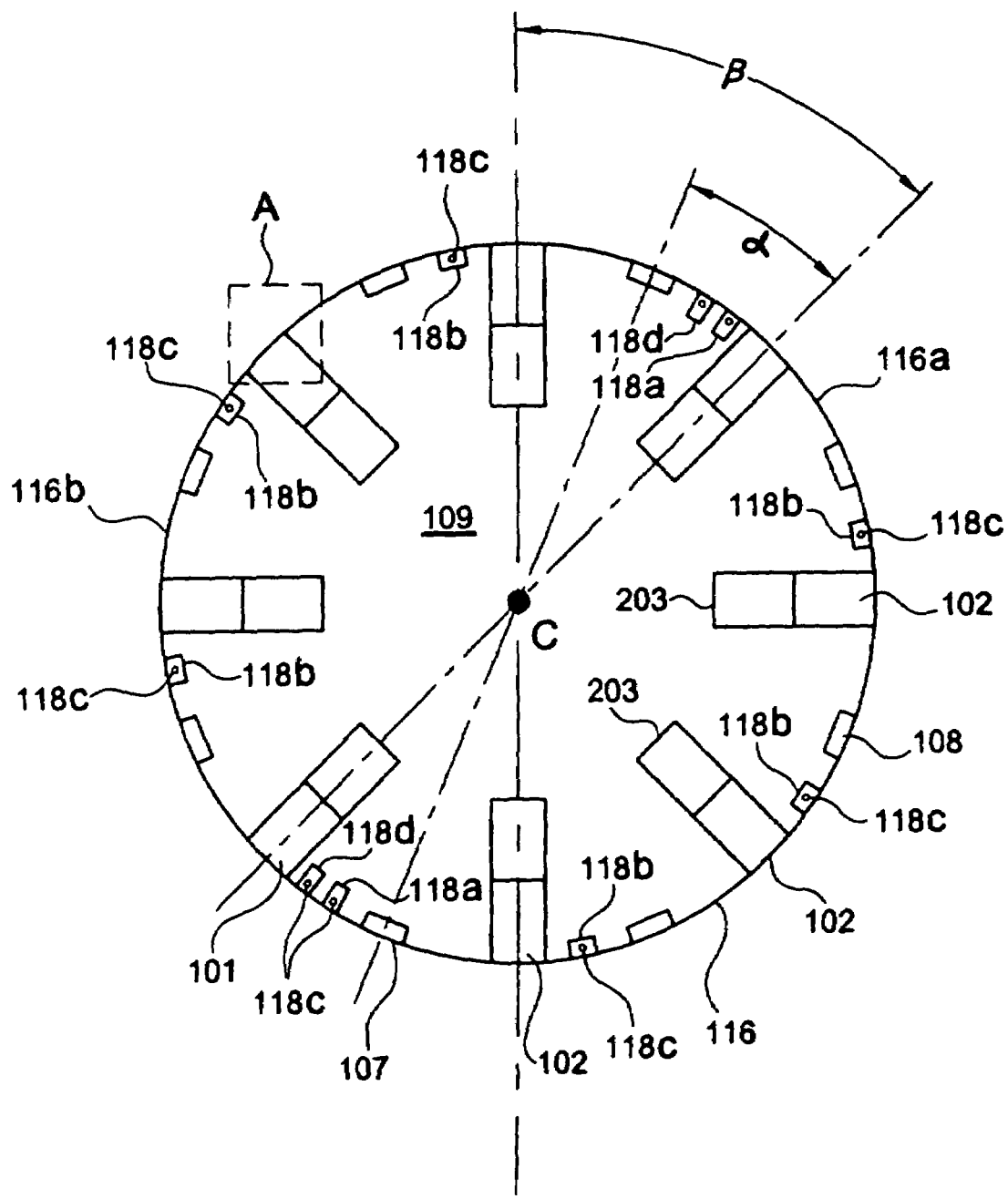
FIG. 1A is a layout diagram of an exemplary flywheel according to the present invention.

FIG. 1A is a layout diagram of an exemplary flywheel according to the present invention. In FIG. 1A, a flywheel 109 may be formed from a cylindrical core of composite material(s), such as nylon, and may be banded along a circumferential edge of the flywheel by a non-magnetic retaining ring 116, such as non-magnetic stainless steel or phenolic materials. The flywheel 109 may include a plurality of magnets 102 disposed within a plurality of equally spaced first radial grooves 101 of the flywheel 109, wherein each of the magnets 102 may generate relatively strong magnetic fields. In addition, each of the magnets 102 may have cylindrical shapes and may be backed by a backing plate 203, such as soft iron or steel, disposed within each of the plurality of first radial grooves 101 in order to extend the polar fields of the magnets 102 closer to a center C of the flywheel 109.

Figure 3:
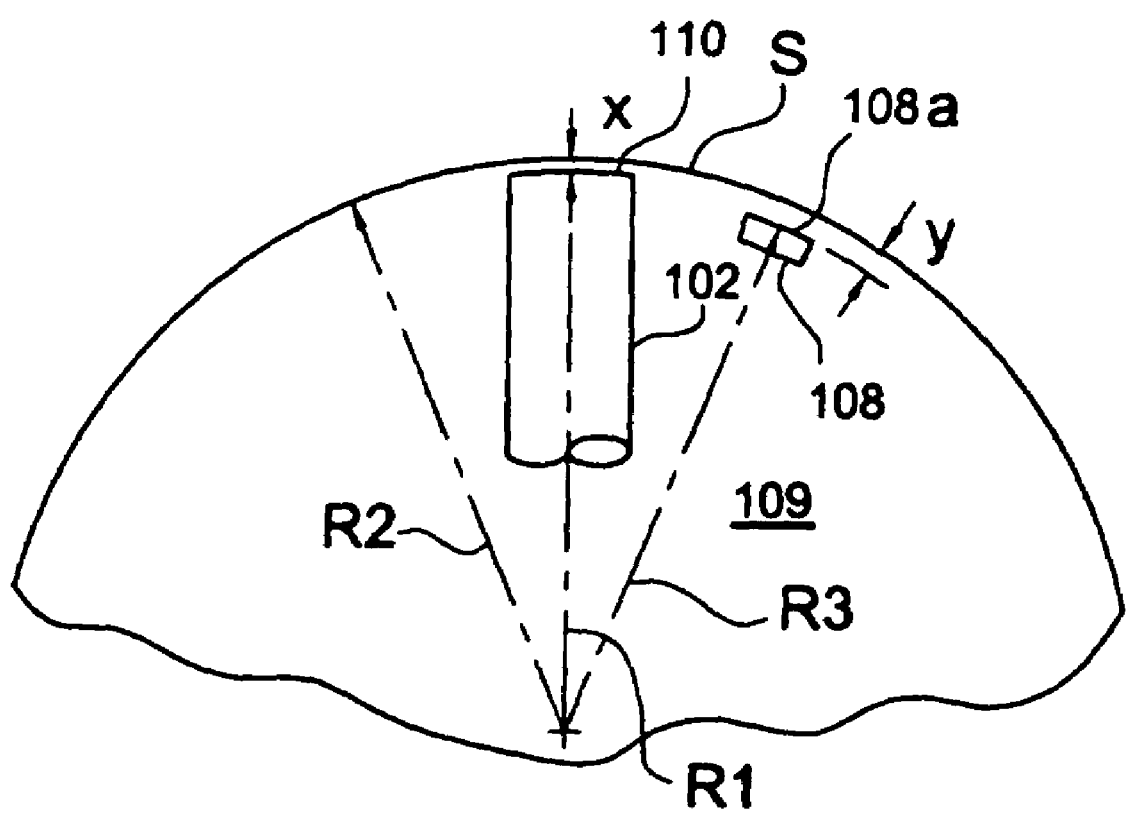
FIG. 3 is an enlarged view of region A of FIG. 1A showing an exemplary placement of driver magnets within a flywheel according to the present invention.

In FIG. 1A, the flywheel 109 may also include a plurality of suppressor magnets 108 disposed within a plurality of second radial grooves 107 along a circumferential face of the flywheel 109. Accordingly, as shown in FIG. 3, surfaces 110 of the magnets 102 may be spaced from a circumferencial surface S of the flywheel 109 by a distance X, and surfaces of the suppressor magnets 108 may be recessed from the circumferencial face S of the flywheel 109 by a distance Y.

In FIG. 1A, each of the plurality of second radial grooves 107 may be disposed between each of the plurality of first grooves 101. For example, each one of eight suppressor magnets 108 may be disposed within each of eight grooves 107 and each one of eight magnets 102 may be disposed within each of eight grooves 101. Accordingly, an angular separation β between each of the first radial grooves 101 may be twice an angular separation α between adjacent first and second radial grooves 101 and 107. Of course, the total number of magnets 102 and 108 and the first and second grooves 101 and 107, respectively, may be changed. The suppressor magnets 108 in the eight grooves 107 and the magnets 102 in the eight grooves 101 of the flywheel 109 have their north magnetic fields facing toward the circumferential surface S (in FIG. 3) of the flywheel 109 and their south magnetic fields facing radial inward toward a center portion C of the flywheel 109. Alternatively, opposite polar arrangement may be possible such that the suppressor magnets 108 and the magnets 102 may have their south magnetic fields facing toward the circumferential surface S (in FIG. 3) of the flywheel 109 and their north magnetic fields facing radial inward toward a center portion C of the flywheel 109.

Figure 9:
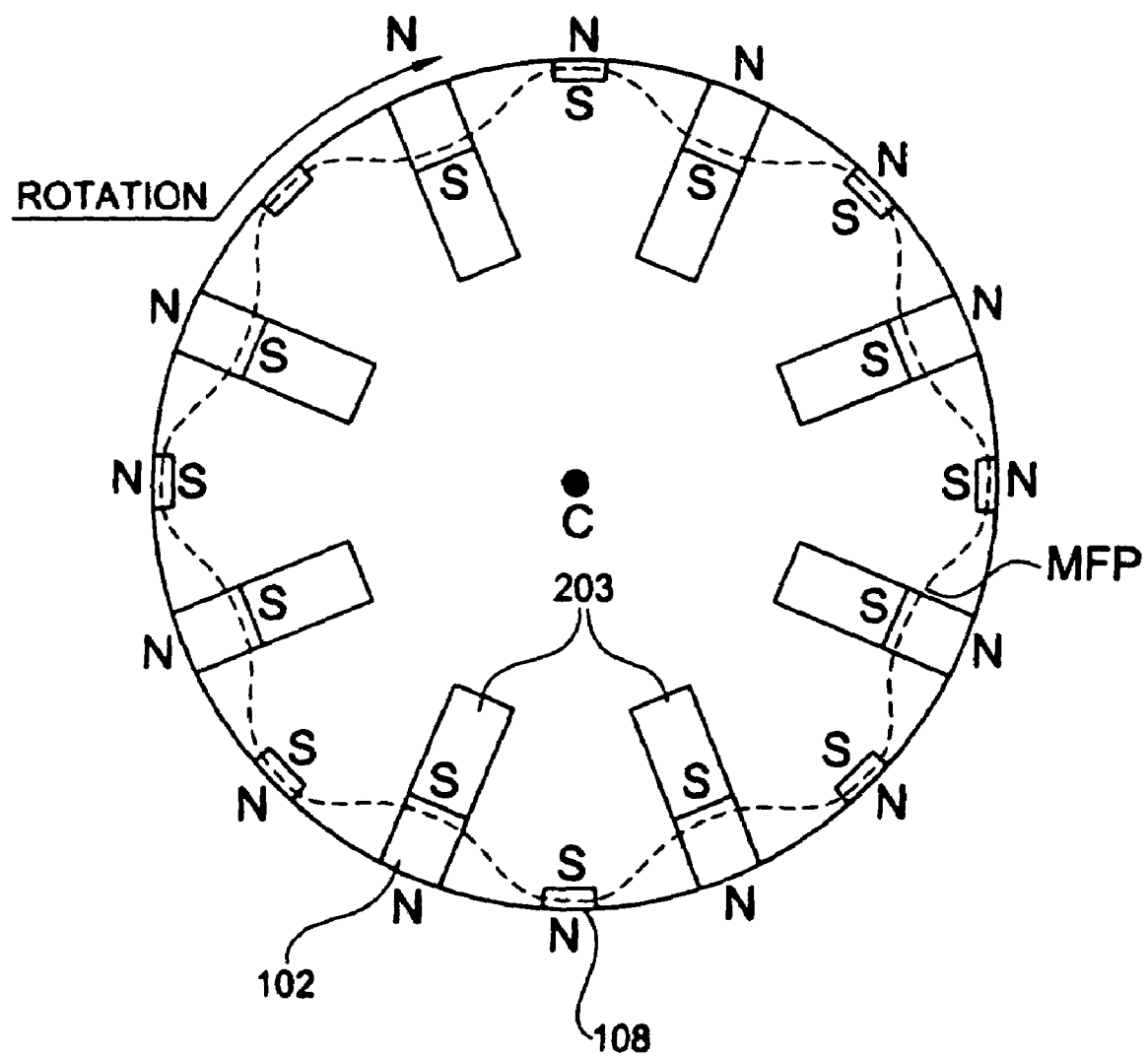
FIG. 9 is a schematic diagram of exemplary magnetic fields of the flywheel of FIGS. 1A-C according to the present invention.

In FIG. 1A, backing plates 203 may be disposed at end portions of the magnets disposed within the plurality of first grooves 101 at the south poles of the magnets 102 in order to form a magnetic field strength along a radial direction toward the circumferential surface S (in FIG. 3) of the flywheel 109. Although not specifically shown, each of the backing plates may be attached to the flywheel 109 using a fastening system, such as retaining pins and/or bolts, or may be retained within the flywheel 109 due to the specific geometry of the magnets 102 within the first grooves 101. Accordingly, interactions of the magnetic fields of the magnets 102 within the plurality of first grooves 101 and the suppressor magnets 108 disposed within the plurality of second grooves 107 create a magnetic field pattern (MFP), as shown in FIG. 9, of repeating arcuate shapes, i.e., sinusoidal curve, around the circumferential surface S (in FIG. 3) of the flywheel 109.

In FIG. 1A, the flywheel 109 may be formed of plastic material(s), such as PVC and Plexiglas. In addition, the flywheel may be formed of molded plastic material(s), and may be formed as single structure. The material or materials used to form the flywheel 109 may include homogeneous materials in order to ensure a uniformly balanced system. In addition to the circular geometry shown in FIG. 1A, other geometries may be used for the flywheel 109. For example, polygonal and triangular geometries may be used for the flywheel 109. Accordingly, the number of magnets 102 and the suppressor magnets 108 and placement of the magnets 102 and the suppressor magnets 108 may be adjusted to provide magnetic coupling to a corresponding generator disk 111 (in FIG. 8).

Figure 1B:
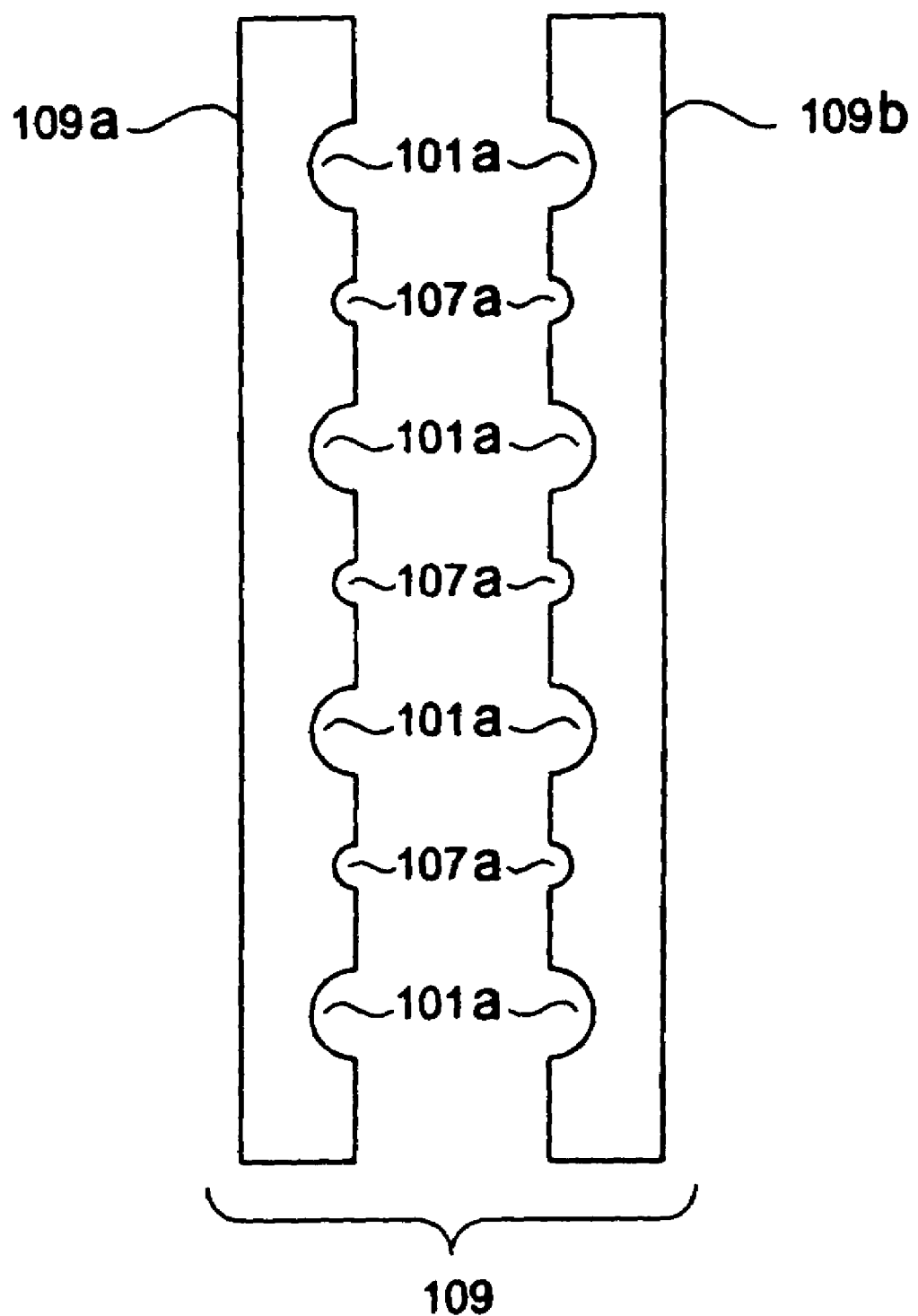
FIG. 1B is a side view of an exemplary flywheel according to the present invention.

FIG. 1B is a side view of an exemplary flywheel according to the present invention. In FIG. 1B, the flywheel 109 may include first and second body portions 109a and 109b. Accordingly, the first and second grooves 101 and 107 may be formed as semicircular grooves 101a and 107a in the first and second body portions 109a and 109b. In addition, although the first and second grooves 101 and 107 are shown to be circular, other geometries may be provided in order to conform to the geometries of the magnets 102 and the suppressor magnets 108.

In FIG. 1A, the total number of the magnets 102 and the suppressor magnets 108 may be adjusted according to an overall diameter of the flywheel 109. For example, as the diameter of the flywheel 109 increases, the total number of magnets 102 and the suppressor magnets 108 may increase. Conversely, as the diameter of the flywheel 109 decreases, the total number of magnets 102 and the suppressor magnets 108 may decrease. Furthermore, as the diameter of the flywheel 109 increases or decreases, the total number of magnets 102 and the suppressor magnets 108 may increase or decrease, respectively. Alternatively, as the diameter of the flywheel 109 increases or decreases, the total number of magnets 102 and the suppressor magnets 108 may decrease or increase, respectively.

Figure 1C:
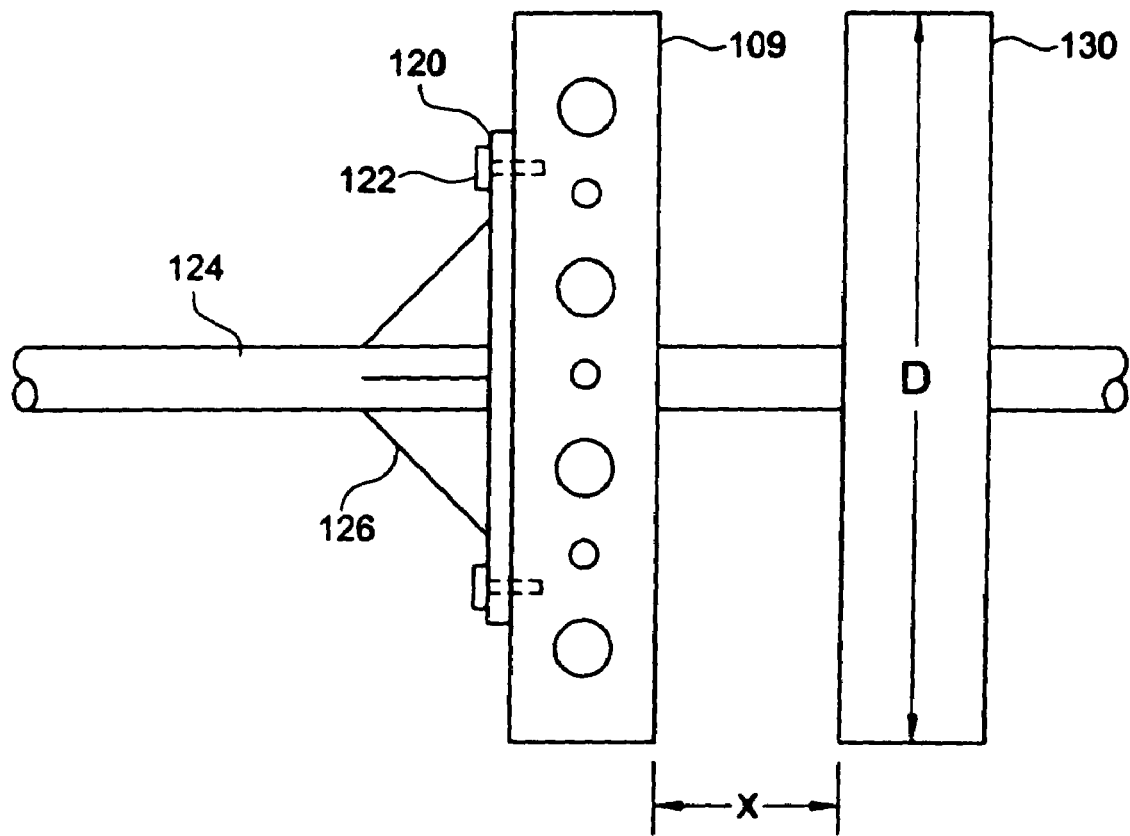
FIG. 1C is a side view of an exemplary attachment structure of the flywheel according to the present invention.

FIG. 1C is a side view of an exemplary attachment structure of the flywheel according to the present invention. In FIG. 1C, the flywheel 109 includes a fastening system having plurality of spaced fastening members 122 that may be used to attach a major face of the flywheel 109 to a shaft backing plate 120. Accordingly, a shaft 124 may be fastened to the shaft backing plate 120 using a plurality of support members 126. In FIG. 1C, the shaft backing plate 120 may be formed having a circular shape having a diameter less than or equal to a diameter of the flywheel 109. In addition, the shaft 124 may extend through the flywheel 109 and may be coupled to an expanding flywheel 130. The expanding flywheel 130 may be spaced from the flywheel 109 by a distance X in order to prevent any deteriorating magnetic interference with the magnets 102 and suppressor magnets 108 within the flywheel 109. The expanding flywheel 130 may include structures (not shown) that would increase an overall diameter D of the expanding flywheel 130 in order to increase the angular inertia of the flywheel 109. Moreover, the shaft 124 may extend through the expanding flywheel 130 to be supported by a support structure (not shown).

Figure 2:
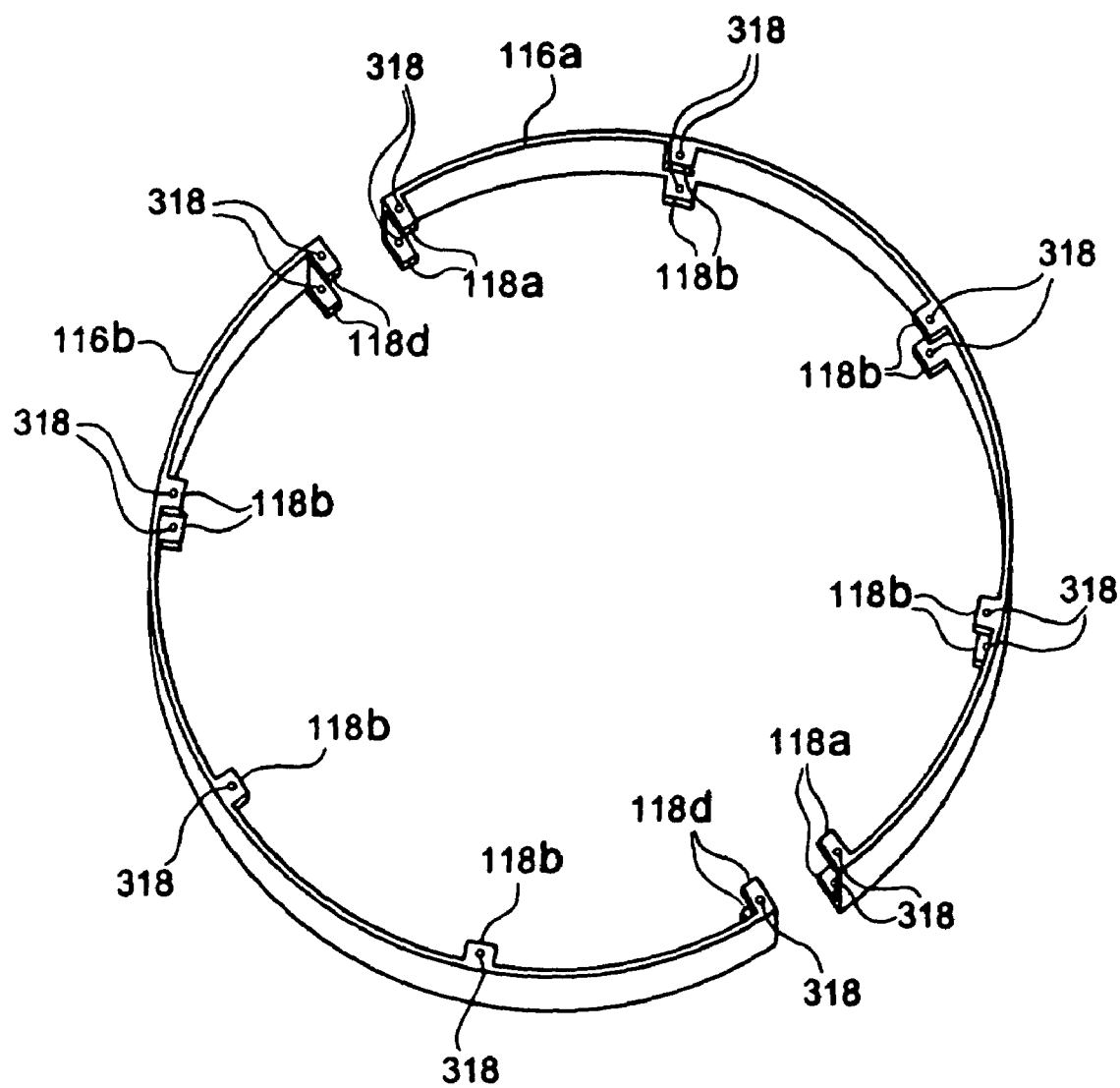
FIG. 2 is a perspective view of an exemplary retaining ring according to the present invention.

FIG. 2 is a perspective view of an exemplary retaining ring according to the present invention. In FIG. 1A, the retaining ring 116 of the flywheel 109 may include a single band of stainless steel material, or may include first and second retaining ring portions 116a and 116b, and may include attachment tabs 118a, 118b, and 118d that attach to the flywheel 109 via fasteners 118c. The first retaining ring portion 116a may have outermost attachment tabs 118a and innermost tabs 118b, and the second retaining ring portion 116b may have outermost attachment tabs 118d and innermost tabs 118b. In addition, as shown in FIG. 2, each of the attachment tabs 118a, 118b, and 118d may include attachment holes 318 for use with a fastener 118c. Each of the attachment tabs 118a, 118b, and 118d may be positioned within a region between the first and second grooves 101 and 107. Although not specifically shown, each of the attachment tabs 118a, 118b, and 118d of the first and second retaining ring portions 116a and 116b may be formed to include two of the attachment holes 318 for use with two fasteners 118c.

As shown in FIG. 1A, the first and second retaining ring portions 116a and 116b may cover the entire circumferential surface S (in FIG. 3) of the flywheel 109. Accordingly, the outermost attachment tabs 118a of the first retaining ring portion 116a and the outermost attachment tabs 118d of the second retaining ring portion 116b may be fastened to the flywheel 109 at adjacent locations to each other. In addition, although each of the first and second retaining ring portions 116a and 116b are shown having three innermost attachment tabs 118b, different pluralities of the innermost attachment tabs 118b may be used according to the size of the flywheel 109, the number of magnets 102 and 108, and other physical features of the flywheel 109 components within the flywheel 109.

Although not shown in FIG. 1A, a reinforced tape may be provided along an outer circumference of the retaining ring 116. Accordingly, the reinforced tape may provide protection from abrasion to the retaining ring 116.

FIG. 3 is an enlarged view of region A of FIG. 1A showing an exemplary placement of driver magnets within a flywheel according to the present invention. In FIG. 3, the surface 110 of the magnet 102 may have a radius of curvature R1 similar to the radius R2 of the flywheel 109. For example, R1 may be equal to R2, or R1 may be approximately equal to R2. In addition, the surface 108a of the suppressor magnet 108 may have a radius of curvature R3 similar to the radiuses R1 and R2. However, the surface 108a of the suppressor magnet 108 may simply have a flat shape.

Figure 4A:
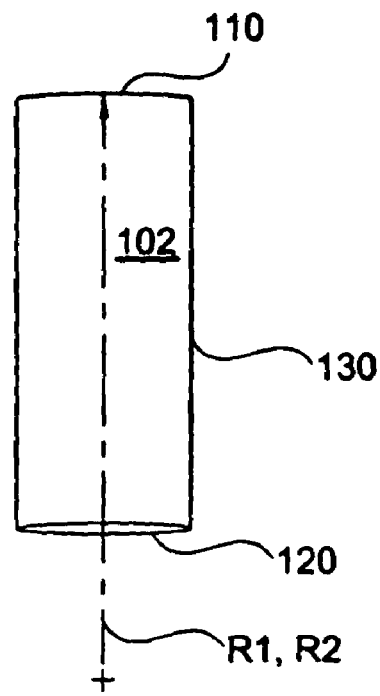
FIGS. 4A and 4B are views of an exemplary driver magnet according to the present invention.
Figure 4B:
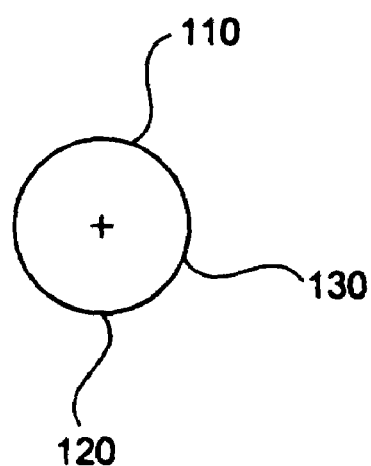

FIGS. 4A and 4B are views of an exemplary driver magnet according to the present invention. In FIG. 4A, the magnet 102 may have a first surface 110 having the radius of curvature R1 that may be similar to the radius R2 of the flywheel 109 (in FIG. 3). In addition, as shown in FIG. 4B, the magnet 102 may include a cylindrical side surface 130 that is constant from a bottom surface 120 of the magnet 102 to the first surface 110 of the magnet 102.

Figure 5A:
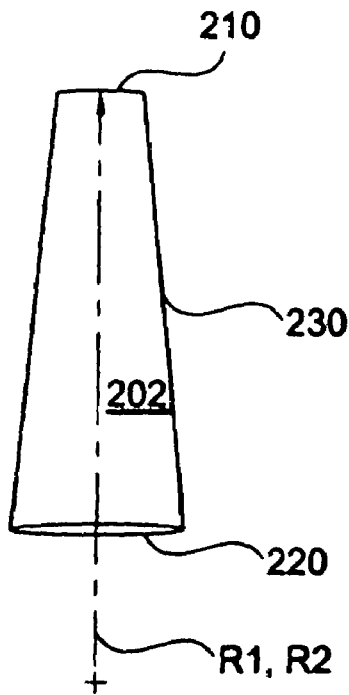
FIGS. 5A and 5B are views of another exemplary driver magnet according to the present invention.
Figure 5B:
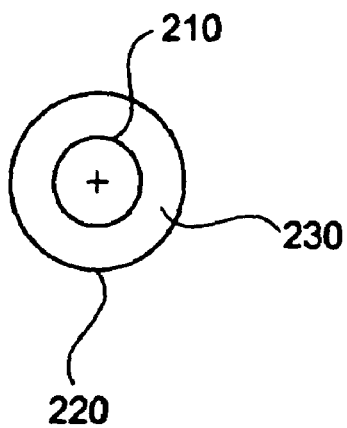

FIGS. 5A and 5B are views of another exemplary driver magnet according to the present invention. In FIG. 5A, the magnet 202 may have a first surface 210 having the radius of curvature R1 that may be similar to the radius R2 of the flywheel 109 (in FIG. 3). In addition, as shown in FIGS. 4A and 4B, the magnet 202 may include a cylindrical side surface 230 that is tapered from a bottom surface 220 of the magnet 202 to the first surface 210 of the magnet 202. Accordingly, the first grooves 101 of the flywheel 109 may have corresponding sidewalls that conform to the tapered cylindrical side surface 230 of the magnet 202. In addition, the back plates 203 may also have corresponding tapered cylindrical surfaces as those of the magnet 202. However, the backing plates may not have tapered cylindrical surfaces as those of the magnet 202.

Figure 6A:
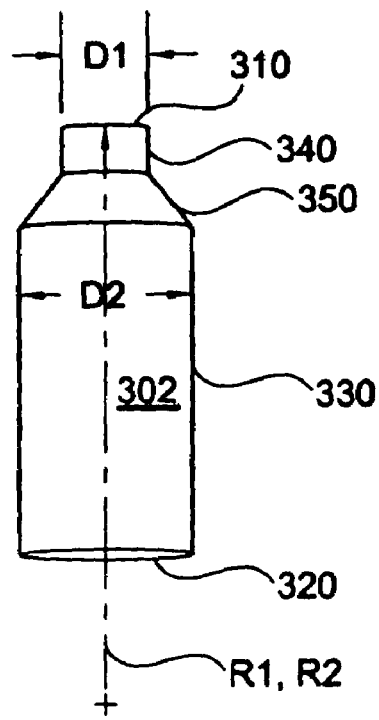
FIGS. 6A and 6B are views of another exemplary driver magnet according to the present invention.
Figure 6B:
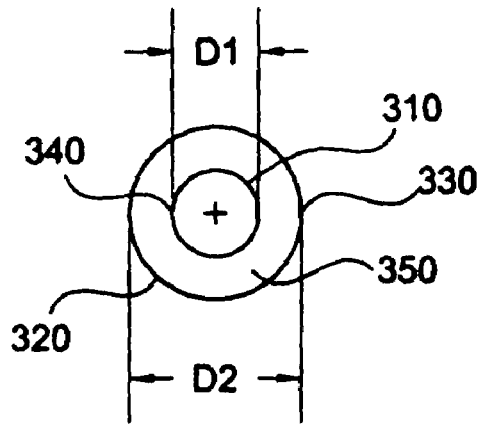

FIGS. 6A and 6B are views of another exemplary driver magnet according to the present invention. In FIG. 6A, the magnet 302 may have a first surface 310 having the radius of curvature R1 that may be similar to the radius R2 of the flywheel 109 (in FIG. 3). In addition, the magnet 302 may have a shoulder portion 350 that transitions from a neck portion 340 having a first diameter D1 to a body portion 330 having a second diameter D2. Furthermore, as shown in FIGS. 6A and 6B, the body portion 330 of the magnet 302 may having a constant diameter D2 from a bottom surface 320 of the magnet 202 to the shoulder portion 350 of the magnet 302. Accordingly, the first grooves 101 of the flywheel 109 may have corresponding portions that conform to the neck, shoulder, and body portions 340, 350, and 330 of the magnet 302.

Figure 7A:
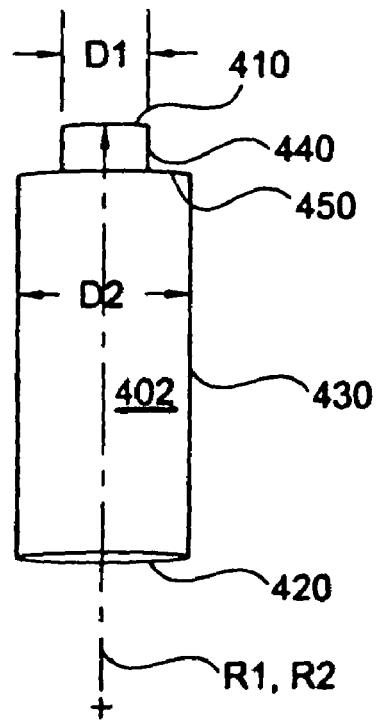
FIGS. 7A and 7B are views of another exemplary driver magnet according to the present invention.
Figure 7B:
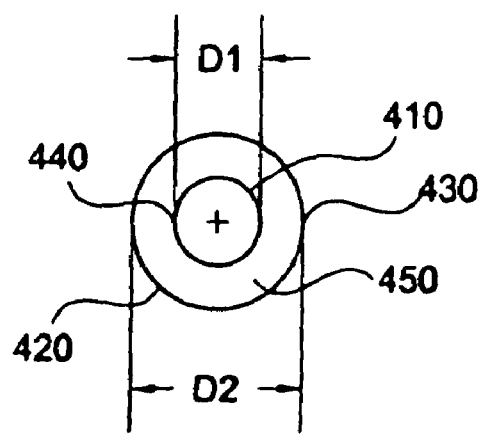

FIGS. 7A and 7B are views of another exemplary driver magnet according to the present invention. In FIG. 7A, the magnet 402 may have a first surface 410 having the radius of curvature R1 that may be similar to the radius R2 of the flywheel 109 (in FIG. 3). In addition, the magnet 402 may have a shoulder portion 450 that transitions from a neck portion 440 having a first diameter D1 to a body portion 430 having a second diameter D2. Furthermore, as shown in FIGS. 7A and 7B, the body portion 430 of the magnet 402 may having a constant diameter D2 from a bottom surface 420 of the magnet 402 to the shoulder portion 450 of the magnet 402. Accordingly, the first grooves 101 of the flywheel 109 may have corresponding portions that conform to the neck, shoulder, and body portions 440, 450, and 430 of the magnet 402.

FIG. 8A is a layout diagram of an exemplary generator disk according to the present invention. In FIG. 8A, a generator disk 111, preferably made from a nylon or composite nylon disk, may include two rectangular magnets 301 opposing each other along a first common center line CL1 through a center portion C of the generator disk 111, wherein each of the rectangular magnets 301 may be disposed along a circumferential portion of the generator disk 111. In addition, additional rectangular magnets 302 may be provided between the two rectangular magnets 301, and may be opposing each other along a second common center line CL2 through a center portion C of the generator disk 111 that is perpendicular to the first common center line CL1. Alternatively, the additional rectangular magnets 302 may be replaced with non-magnetic weighted masses in order to prevent an unbalanced generator disk 111.

Figure 8B:
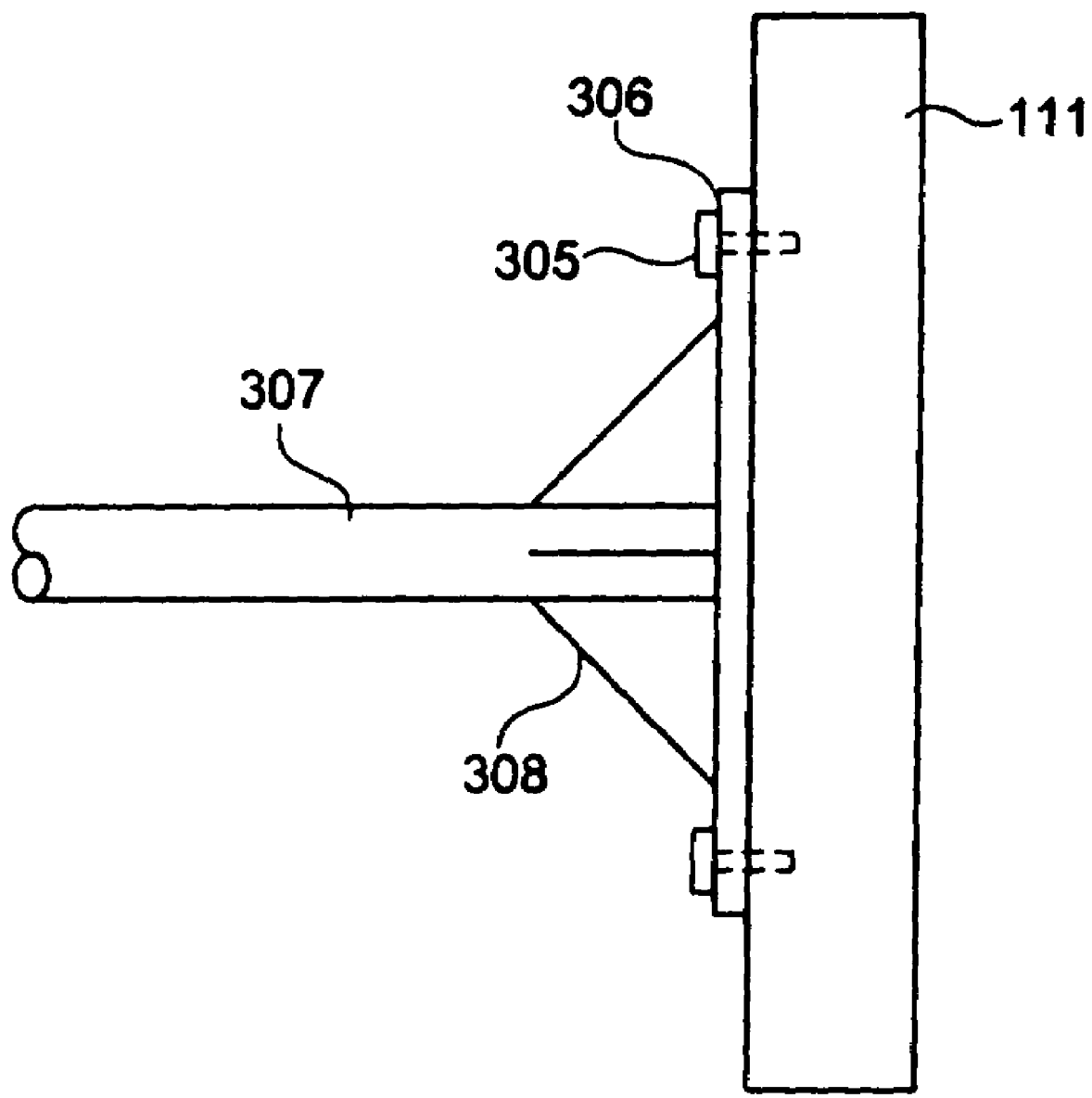
FIG. 8B is a side view of an exemplary shaft attachment to a generator disk according to the present invention.

In FIG. 8A, each of the two rectangular magnets 301, as well as each of the additional rectangular magnets 302 or the non-magnetic weighted masses, may have a first length L extending along a direction perpendicular to the first and second common center lines CL1 and CL2, wherein a thickness of the two rectangular magnets 301, as well as each of the additional rectangular magnets 302 or the non-magnetic weighted masses, may be less than the first length L. In addition, each of the two rectangular magnets 301, as well as each of the additional rectangular magnets 302, may have a relatively large magnetic strength, wherein surfaces of the two rectangular magnets 301, as well as each of the additional rectangular magnets 302, parallel to a major surface of the generator disk 111 may be one of south and north poles. Moreover, either an even-number or odd-number of magnets 301 may be used, and interval spacings between the magnets 301 may be adjusted to attain a desired magnetic configuration of the generator disk 111. FIG. 8B is a side view of an exemplary shaft attachment to a generator disk according to the present invention. In FIGS. 8A and 8B, the generator disk 111 includes a plurality of spaced fastening members 305 that may be used to attach the generator disk 111 to a shaft backing plate 306. Accordingly, a shaft 307 may be fastened to the shaft backing plate 306 using a plurality of support members 308. In FIG. 8B, the shaft backing plate 306 may be formed having a circular shape having a diameter less than or equal to a diameter of the generator disk 111.

In FIGS. 8A and 8B, the generator disk 111 may be formed of the same, or different materials from the materials used to form the flywheel 109 (in FIG. 1A). Moreover, the geometry of the generator disk 111 may be circular, as shown in FIG. 8A, or may be different, such polygonal and triangular shapes. In addition, the total number of the magnets 301, as well as each of the additional rectangular magnets 302 or the non-magnetic weighted masses, may be adjusted according to an overall diameter of the flywheel 109 and/or the generator disk 111. For example, as the diameter of the flywheel 109 and/or the generator disk 111 increases, the total number and size of the magnets 301, as well as each of the additional rectangular magnets 302 or the non-magnetic weighted masses, may increase. Conversely, as the diameter of the flywheel 109 and/or generator disk 111 decreases, the total number and size of the magnets 301, as well as each of the additional rectangular magnets 302 or the non-magnetic weighted masses, may decrease. Furthermore, as the diameter of the flywheel 109 and/or the generator disk 111 increases or decreases, the total number and size of the magnets 301, as well as each of the additional rectangular magnets 302 or the non-magnetic weighted masses, may increase or decrease, respectively. Alternatively, as the diameter of the flywheel 109 and/or the generator disk 111 increases or decreases, the total number and size of the magnets 301, as well as each of the additional rectangular magnets 302 or the non-magnetic weighted masses, may decrease or increase, respectively.

FIG. 9 is a schematic diagram of exemplary magnetic fields of the flywheel of FIG. 1 according to the present invention. In FIG. 9, interactions of the magnetic fields of the magnets 102 and the suppressor magnets 108 create a magnetic field pattern (MFP) of repeating arcuate shapes, i.e., sinusoidal curve, around the circumferential surface S of the flywheel 109. Accordingly, the backing plates 203 and the suppressor magnets 108 provide for displacement of the south fields of the magnets 102 toward the center C of the flywheel 109.

Figure 10:
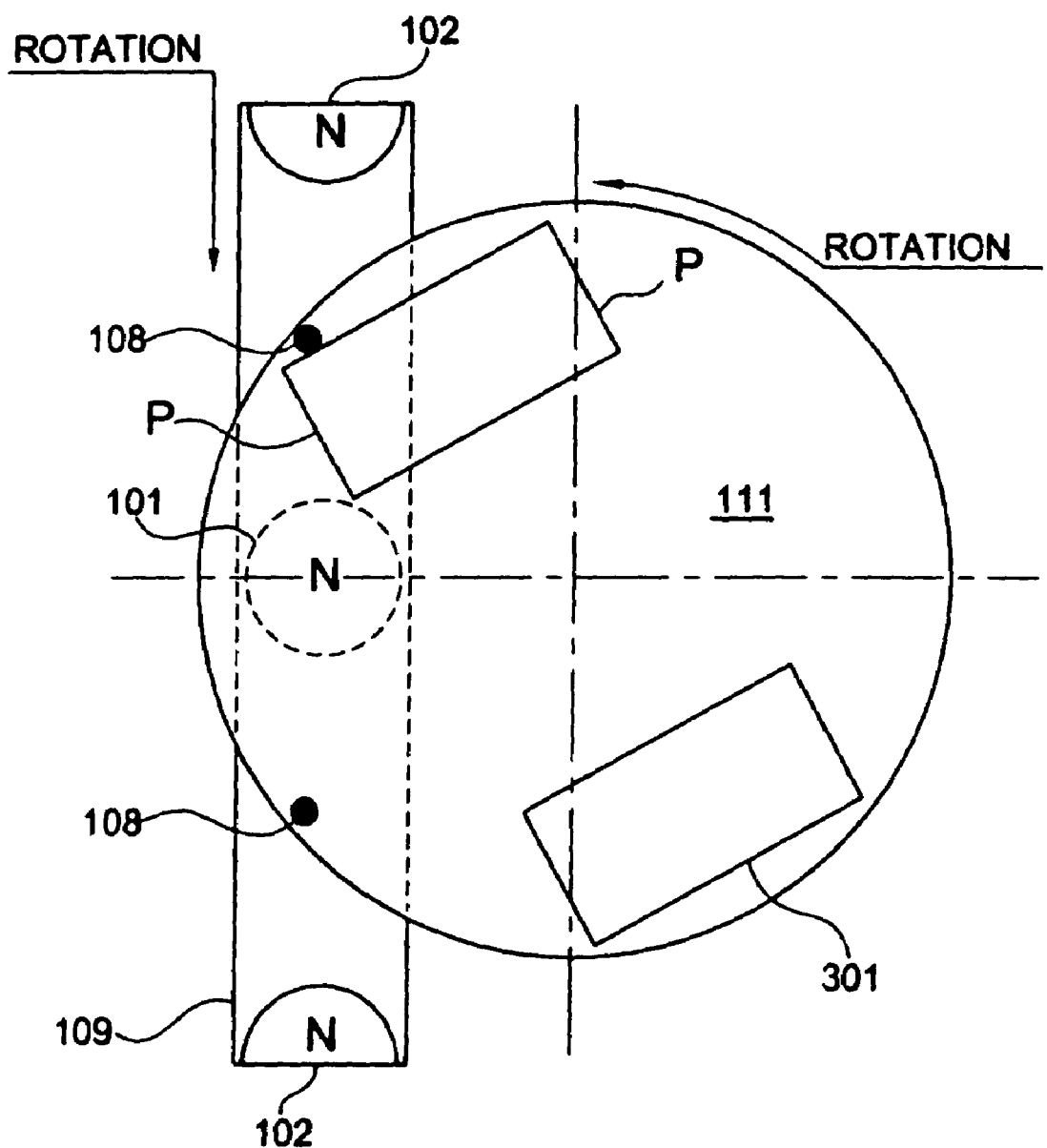
FIG. 10 is a schematic diagram of an exemplary initial magnetic compression process of the torque converter according to the present invention.
Figure 11A:
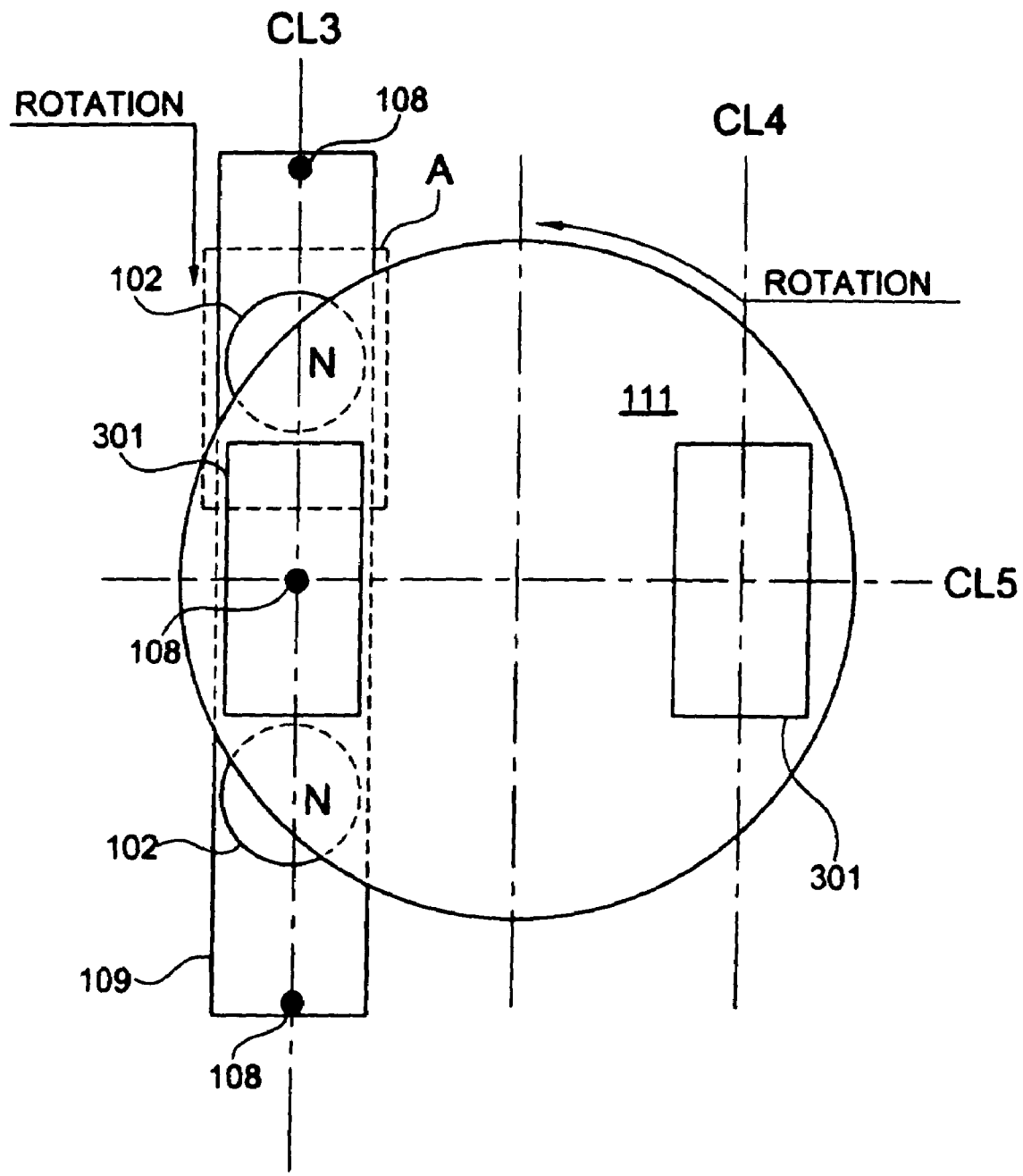
FIG. 11A is a schematic diagram of an exemplary magnetic compression process of the torque converter according to the present invention.
Figure 11B:
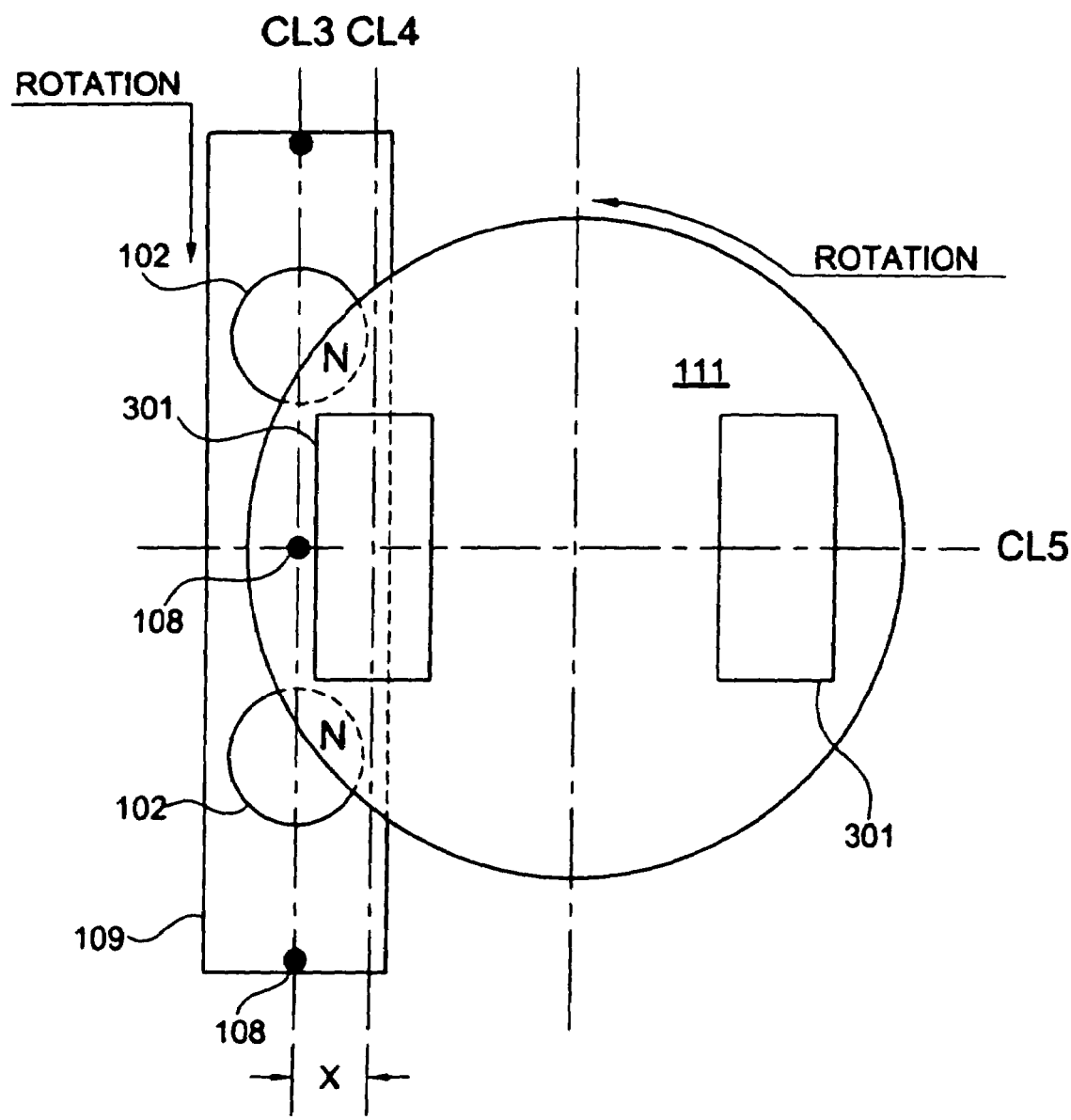
FIG. 11B is a schematic diagram of another exemplary magnetic compression process of the torque converter according to the present invention.
Figure 11C:
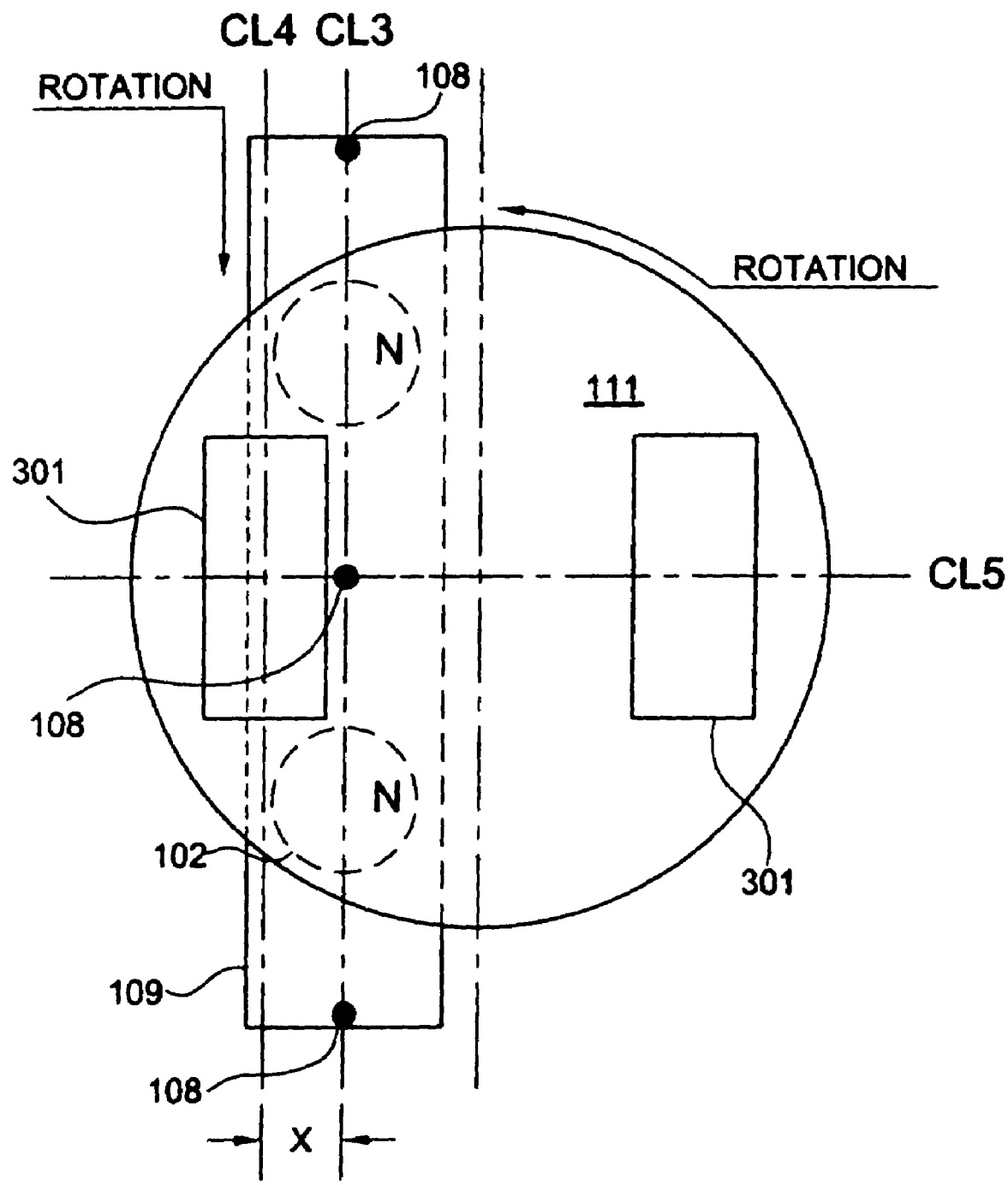
FIG. 11C is a schematic diagram of another exemplary magnetic compression process of the torque converter according to the present invention.
Figure 11D:
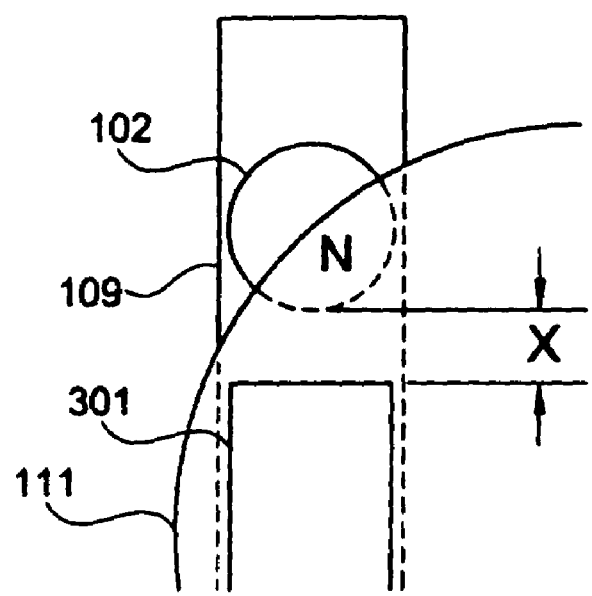
FIG. 11D is an enlarged view of region A of FIG. 11A according to the present invention.
Figure 11E:
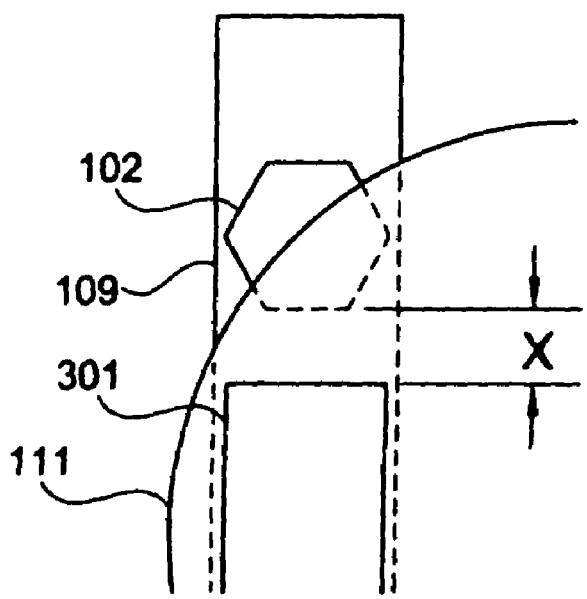
FIG. 11E is another enlarged view of region A of FIG. 11A according to the present invention.
Figure 11F:
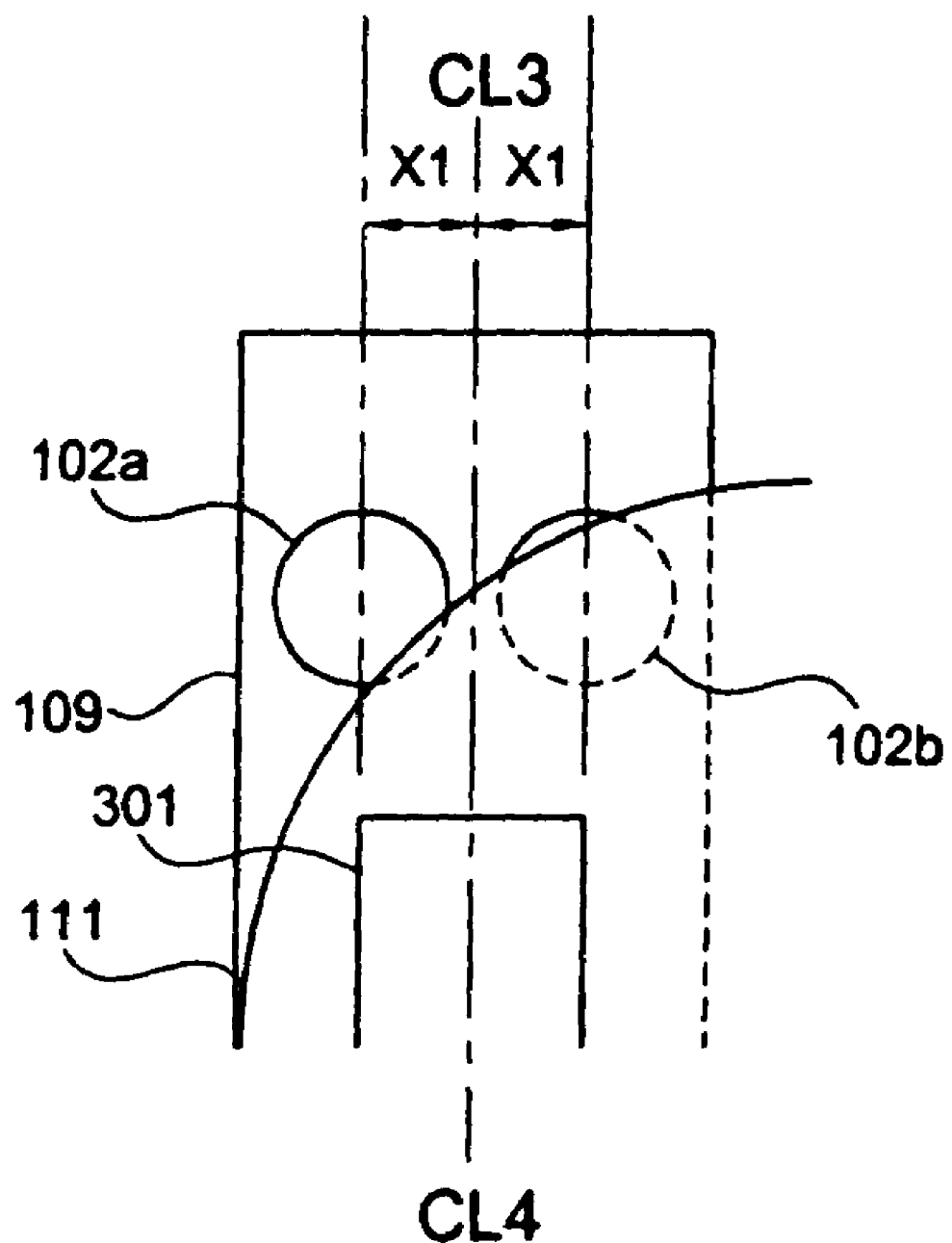
FIG. 11F is another enlarged view of a region A of FIG. 11A according to the present invention.
Figure 12:
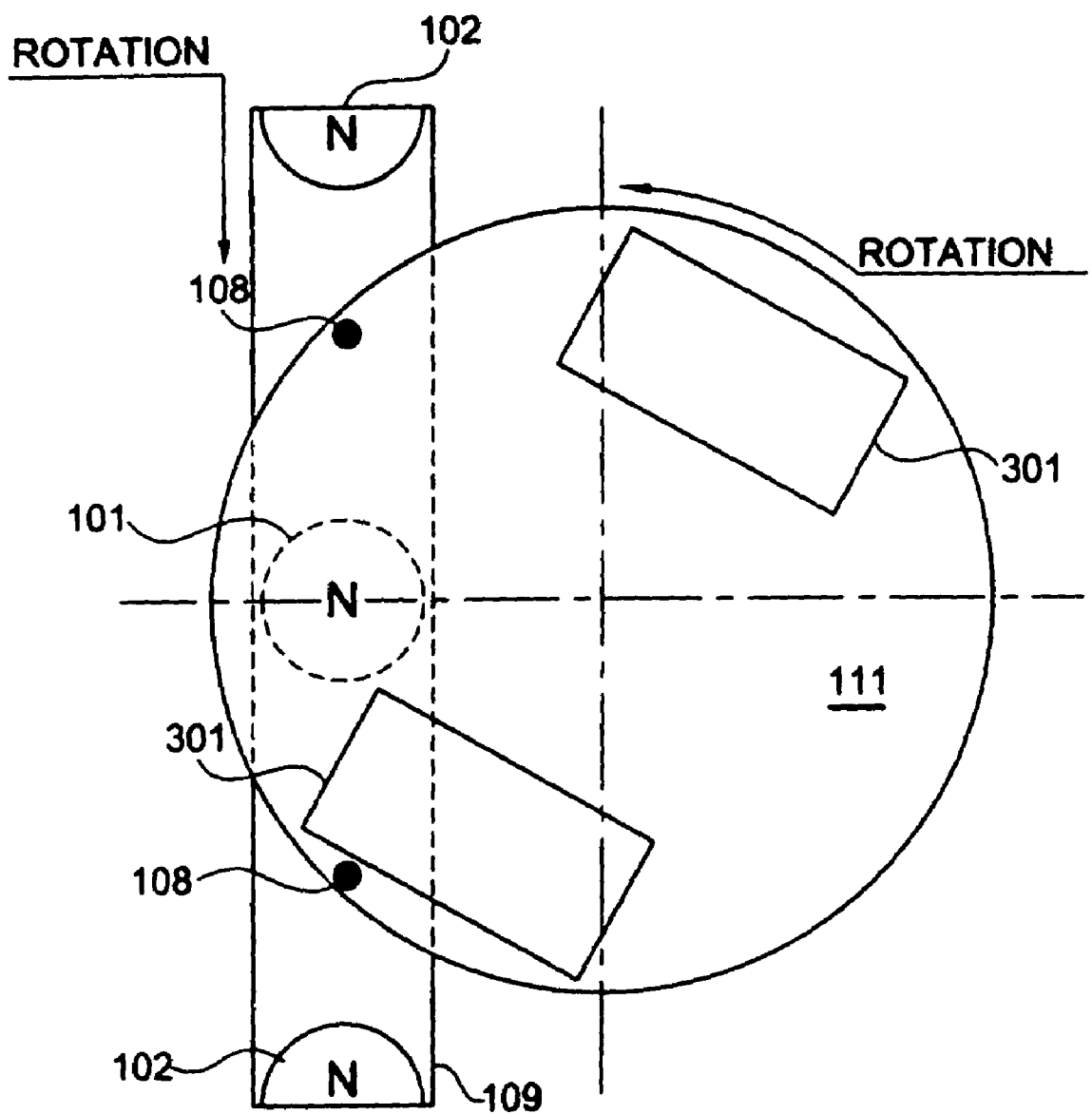
FIG. 12 is a schematic diagram of an exemplary magnetic decompression process of the torque converter according to the present invention.

FIG. 10 is a schematic diagram of an exemplary initial magnetic compression process of the torque converter according to the present invention, FIG. 11 is a schematic diagram of an exemplary magnetic compression process of the torque converter according to the present invention, and FIG. 12 is a schematic diagram of an exemplary magnetic decompression process of the torque converter according to the present invention. In each of FIGS. 10, 11, and 12, the schematic view is seen from a rear of the generator disk, i.e., the surface opposite to the surface of the generator disk 111 having the two rectangular magnets 301, and the flywheel 109 is located behind the generator disk 111. In addition, the flywheel 109 is rotating in a downward clockwise direction and the generator disk 111 is rotating along a counterclockwise direction, wherein the generator disk 111 may be spaced from the flywheel 109 by a small air gap, such as within a range of about three-eighths of an inch to about 0.050 inches. Alternatively, the small air gap may be determined by specific application. For example, systems requiring a larger configuration of the flywheel and generator disk may require larger or smaller air gaps. Similarly, systems requiring more powerful or less powerful magnets may require air gaps having a specific range of air gaps. Moreover, for purposes of explanation the magnets 102 will now simply be referred to as driver magnets 102.

In FIG. 10, one of the two rectangular magnets 301 disposed on the generator disk 111 begins to enter one of the spaces within a magnetic field pattern (MFP) of the flywheel 109 between two north poles generated by the driver magnets 102. The driver magnets 102 may be disposed along a circumferential center line of the flywheel 109, or may be disposed along the circumference of the flywheel 109 in an offset configuration. The gap between the driver magnets 102 in the flywheel 109 is a position in which the MFP where the south pole field is the closest to the circumferential surface S (in FIG. 9) of the flywheel 109.

In FIG. 10, as the flywheel 109 rotates along the downward direction, the north pole of one of the two rectangular magnets 301 on the generator disk 111 facing the circumferential surface S (in FIG. 9) of the flywheel 109 enters adjacent north magnetic field lines of the driver magnets 102 along a shear plane of the two rectangular magnets 301 and the driver magnets 102. Accordingly, the shear force required to position one of the two rectangular magnets 301 between the adjacent driver magnets 102 is less than the force required to directly compress the north magnetic field lines of the two rectangular magnets 301 between the adjacent driver magnets 102. Thus, the energy necessary to position one of the two rectangular magnets 301 between adjacent ones of the driver magnets 102 is relatively low.

In addition, the specific geometrical interface between the driver and rectangular magnets 102 and 301 provides for a relatively stable repulsive magnetic field. For example, the cylindrical surface 130 (in FIG. 4) of the adjacent driver magnets 102, as well as the cylindrical surfaces of the other exemplary driver magnets 202, 302, and 402 in FIGS. 5, 6, and 7, generate specific magnetic fields from the curved surfaces 110 and the bottom surfaces 120 of the driver magnets 102. In addition, the planar surfaces P (in FIG. 8) of the rectangular magnet 301 entering the adjacent magnetic fields of the adjacent driver magnets 102 generate another specific magnetic field. Accordingly, the interaction of the magnetic fields of the driver and rectangular magnets 102 and 301, and more specifically, the manner in which the magnetic fields of the driver and rectangular magnets 102 and 301 are brought into interaction, i.e., along a magnetic shear plane, create a relatively stable repulsive magnetic field.

In addition, although the suppressor magnet 108 also provides a repelling force to the driver magnet 102, the force of repulsion of the suppressor magnet 108 is relatively less than the repulsive force of the rectangular magnet 301. However, as will be explained with regard to FIG. 12, the suppressor magnet 108 provides an additional repulsion force when the magnetic fields of the driver and rectangular magnets 102 and 301 are decompressed.

Figure 13:
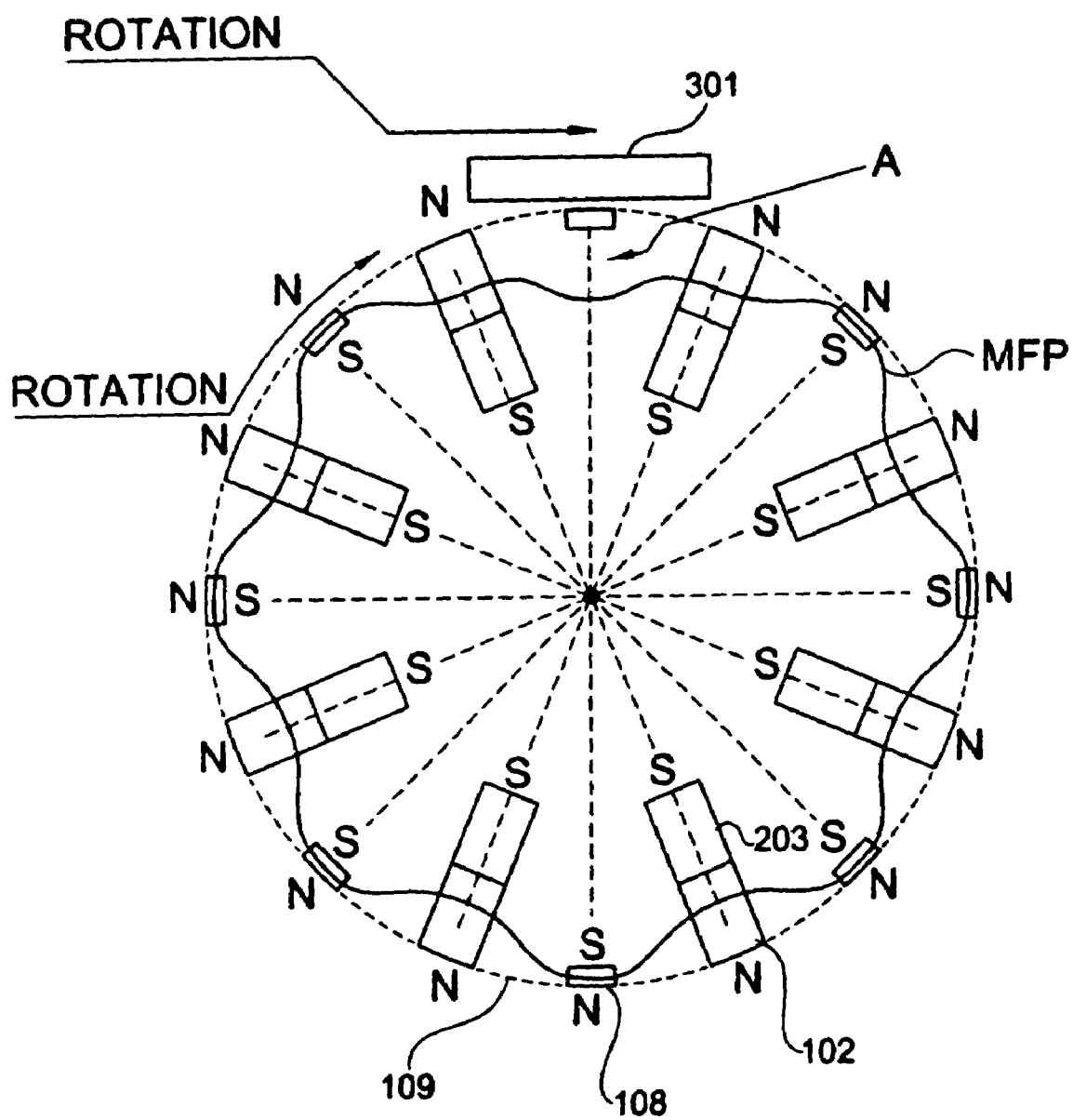
FIG. 13 is a schematic diagram of an exemplary magnetic force pattern of the flywheel of FIG. 1 during a magnetic compression process of FIG. 11 according to the present invention.

In FIG. 11A, once the rectangular magnet 301 on the generator disk 111 fully occupies the gap directly between the north poles of two adjacent driver magnets 102 of the flywheel 109, the weaker north pole (as compared to the north poles of the driver and rectangular magnets 102 and 301) of the suppressor magnet 108 on the flywheel 109 is repelled by the presence of the north pole of the rectangular magnet 301 on the generator disk 111. Thus, both the north and south magnetic fields of the MFP below the outer circumference of the flywheel 109 are compressed, as shown at point A (in FIG. 13).

In FIG. 11A, a centerline CL3 of the flywheel 109 is aligned with a centerline CL4 of the magnet 301 of the generator disk 111 during magnetic field compression of the driver magnets 102, the suppressor magnet 108, and the magnet 301 of the generator disk 301. Accordingly, placement of the rotation axis of the flywheel 109 and the rotation axis of the generator disk 111 must be set such that the centerline CL3 of the flywheel 109 is aligned with the centerline CL4 of the magnet 301 of the generator disk 111.

However, as shown in FIGS. 11B and 11C, placement of the rotation axis of the flywheel 109 and the rotation axis of the generator disk 111 may be set such that the centerline CL3 of the flywheel 109 may be offset from the centerline CL4 of the magnet 301 of the generator disk 111 by a distance X. Accordingly, the magnetic field compression of the driver magnets 102, the suppressor magnet 108, and the magnet 301 of the generator disk 301 may be altered in order to provide specific repulsion forces between the driver magnets 102, the suppressor magnet 108, and the magnet 301 of the generator disk 301.

FIG. 11D is an enlarged view of region A of FIG. 11A according to the present invention. In FIG. 11D, a distance X between facing surfaces of the driver magnet 102 (and likewise the other driver magnet 102 adjacent to the opposing end of the magnet 301 of the generator disk 111) is set in order to provide specific magnetic field compression of the driver magnets 102 and the magnet 301 of the generator disk 111. Preferably, the distance X may be set to zero, but may be set to a value to ensure that no torque slip occurs between the flywheel 109 and the generator disk 111. The torque slip is directly related to the magnetic field compression strength of the driver magnets 102 and the magnet 301, as well as the magnetic strength and geometries of the driver magnets 102 and the magnet 301.

FIG. 11E is another enlarged view of region A of FIG. 11A according to the present invention. In FIG. 11, the driver magnet 102 may have a cross-sectional geometry that includes a polygonal shape, wherein a side of the polygonal shaped driver magnet 102 may be parallel to a side of the magnet 301 of the generator disk 11. However, the distance X between facing surfaces of the driver magnet 102 (and likewise the other driver magnet 102 adjacent to the opposing end of the magnet 301 of the generator disk 111) is set in order to provide specific magnetic field compression of the driver magnets 102 and the magnet 301 of the generator disk 111. Preferably, the distance X may be set to zero, but may be set to a value to ensure that no torque slip occurs between the flywheel 109 and the generator disk FIG. 11F is another enlarged view of a region A of FIG. 11A according to the present invention. In FIG. 11F, pairs of driver magnets 102a and 102b may be provided in the flywheel 109. The driver magnets 102a and 102b may be provided along centerlines CL3A and CL3B, respectively, and may be spaced apart from the centerline CL3 of the flywheel 109, as well as the aligned centerline CL4 of the magnet 301 of the generator disk 111. Accordingly, the magnetic field compression of the pair of driver magnets 102a and 102b and the magnet 301 of the generator disk 301 may be altered in order to provide specific repulsion forces between the pair of driver magnets 102a and 102b, the suppressor magnet 108, and the magnet 301 of the generator disk 301. As with the polygonal shaped geometry of the single driver magnets 102, in FIG. 11E, the pair of driver magnets 102a and 102b may have polygonal shaped geometries. In addition, similar to the distance X, as shown in FIGS. 11D and 11E, distances between facing surfaces of the pair of driver magnets 102a and 102b (and likewise the other pair of driver magnets 102a and 102b adjacent to the opposing end of the magnet 301 of the generator disk 111) is set in order to provide specific magnetic field compression of the pair of driver magnets 102a and 102b and the magnet 301 of the generator disk 111. Preferably, the distance X may be set to zero, but may be set to a value to ensure that no torque slip occurs between the flywheel 109 and the generator disk 111.

In FIG. 12, as the rectangular magnet 301 on the generator disk 111 begins to rotate out of the compressed magnetic field position and away from the flywheel 109, the north pole of the rectangular magnet 301 is strongly pushed away by the repulsion force of the north pole of the trailing driver magnet 102 on the flywheel 109 and by the magnetic decompression (i.e., spring back) of the previously compressed north and south fields in the MFP along the circumferential surface S (in FIG. 9) of the flywheel 109. The spring back force (i.e., magnetic decompression force) of the north pole in the MFP provides added repulsion to the rectangular magnet 301 of the generator disk 111 as the rectangular magnet 301 moves away from the flywheel 109.

Next, another initial magnetic compression process is started, as shown in FIG. 10, and the cycle of magnetic compression and decompression repeats. Thus, rotational movement of the flywheel 109 and the generator disk 111 continues.

Figure 14:
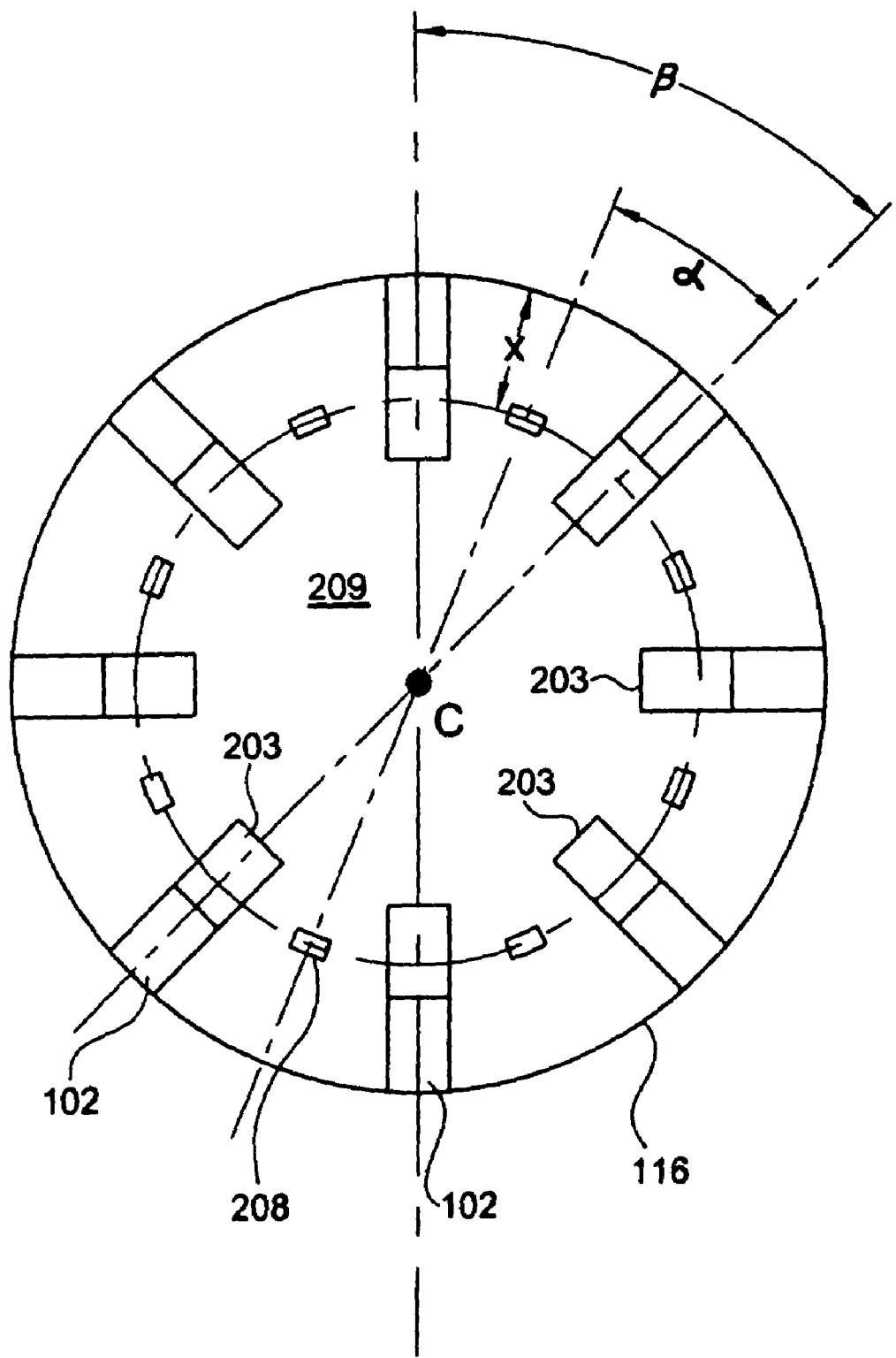
FIG. 14 is a layout diagram of another exemplary flywheel according to the present invention.

FIG. 14 is a layout diagram of another exemplary flywheel according to the present invention. In FIG. 14, a flywheel 209 may include all of the above-described features of the flywheel 109 (in FIGS. 1A-C), but may include suppressor magnets 208 disposed from the circumferential surface S of the flywheel 209 by a distance X. For example, the distance X may be less that a depth of the first grooves 101, and may be disposed between adjacent backing plates 203. Similar to the relative angular displacements α and β of the driver and suppressor magnets 102 and 301, the relative positioning of the suppressor magnets 208 may be disposed between the driver magnets 102. Thus, the suppressor magnets 208 may further displace the south magnetic fields of the driver magnets 102 transmitted by the backing plates 203 toward the center C of the flywheel 209. Moreover, the different exemplary driver magnets of FIGS. 4-7 may be incorporated into the flywheel 209 of FIG. 14.

Figure 15:
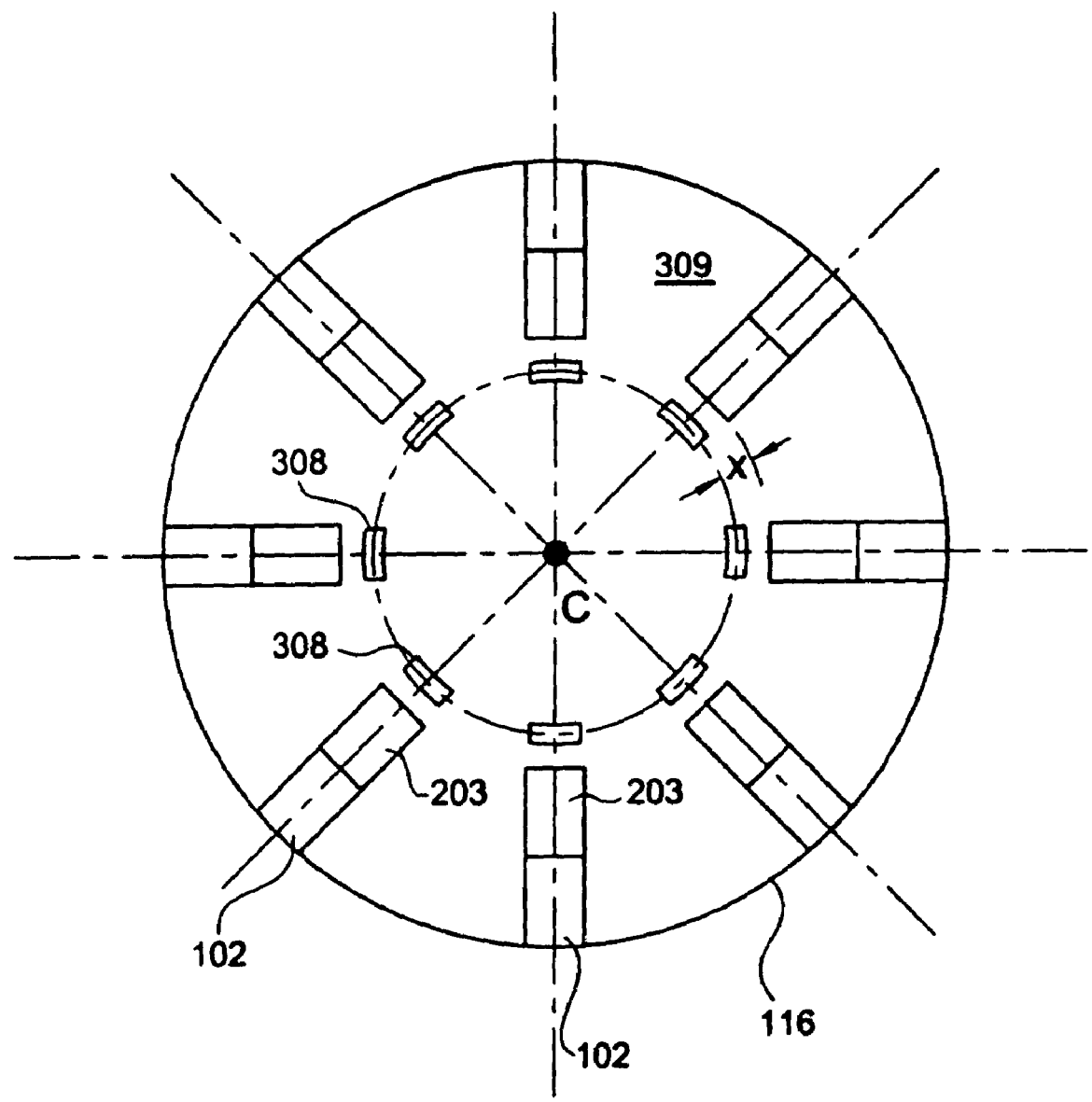
FIG. 15 is a layout diagram of another exemplary flywheel according to the present invention.

FIG. 15 is a layout diagram of another exemplary flywheel according to the present invention. In FIG. 15, a flywheel 309 may include all of the above-described features of the flywheel 109 (in FIGS 1A-C), but may include suppressor magnets 308 disposed from an end portion of the backing plates 203 by a distance X. In addition, the suppressor magnets 308 may be placed along a centerline of the driver magnets 102. Thus, the suppressor magnets 208 may further displace the south magnetic fields of the driver magnets 102 transmitted by the backing plates 203 toward the center C of the flywheel 309. Moreover, the different exemplary driver magnets of FIGS. 4-7 may be incorporated into the flywheel 309 of FIG. 15.

Figure 16:
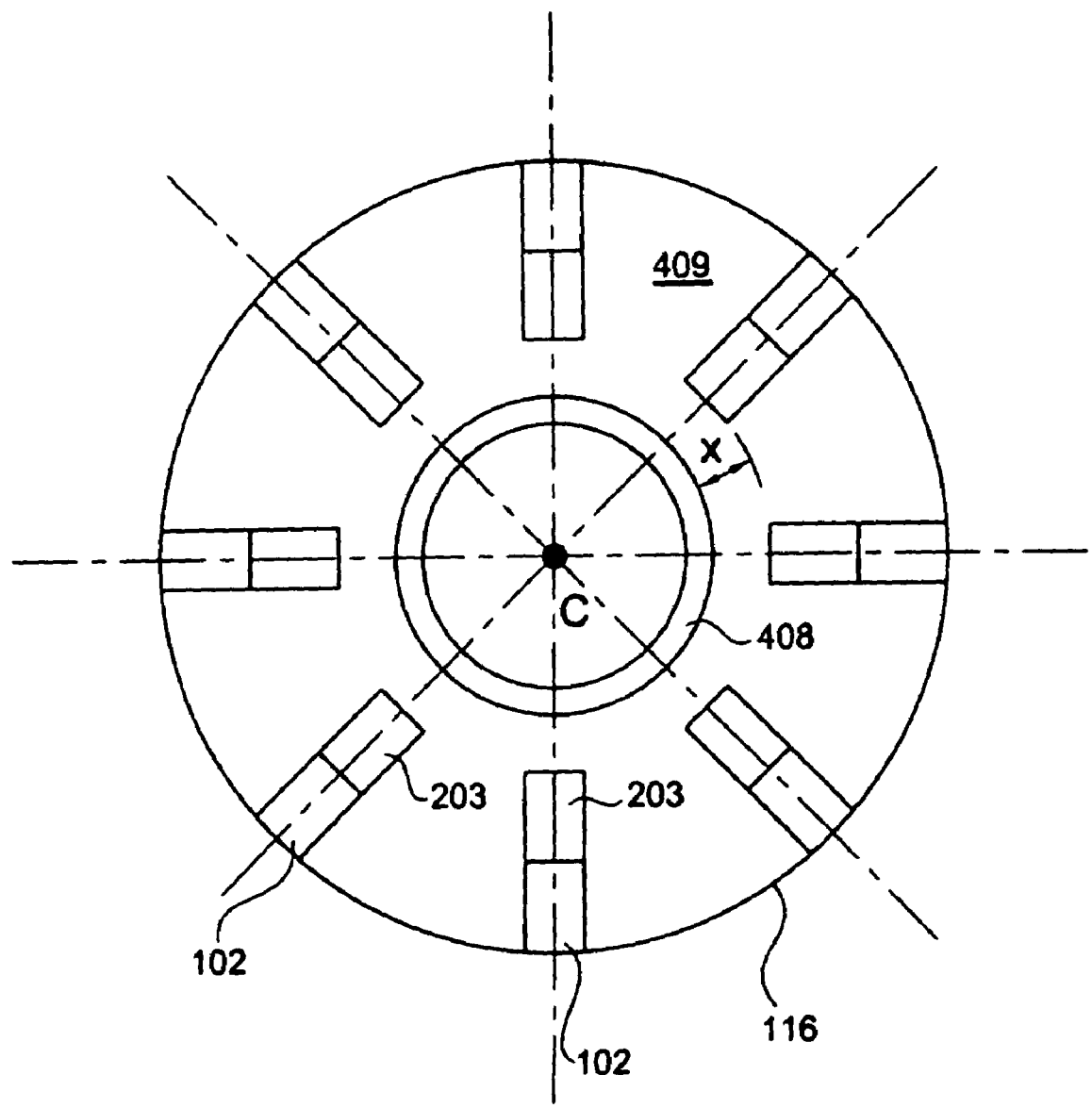
FIG. 16 is a layout diagram of another exemplary flywheel according to the present invention.

FIG. 16 is a layout diagram of another exemplary flywheel according to the present invention. In FIG. 16, a flywheel 409 may include all of the above-described features of the flywheel 109 (in FIGS. 1A-C), but may include a suppressor magnet ring 408 concentrically disposed with the center C of the flywheel 409. Thus, the suppressor magnet ring 408 may further displaces the south magnetic fields of the driver magnets 102 transmitted by the backing plates 203 toward the center C of the flywheel 409. Moreover, the different exemplary driver magnets of FIGS. 4-7 may be incorporated into the flywheel 409 of FIG. 16.

FIG. 17 is a schematic diagram of an exemplary system using the torque converter according to the present invention. In FIG. 17, a system for generating power using the torque converted configuration of the present invention may include a motor 105 powered by a power source 101 using a variable frequency motor control drive 103 to rotatably drive a shaft 407 coupled to the flywheel 109, as well as any of the flywheels of FIGS. 1 and 14-16. In addition, the generator disk 111 may be coupled to a drive shaft 113, wherein rotation of the generator disk 111 will cause rotation of the drive shaft 113. For example, a longitudinal axis of the drive shaft 113 may be disposed perpendicular to a longitudinal axis of the drive shaft 107.

In FIG. 17, the drive shaft 113 may be coupled to a rotor 119 of an electrical generator comprising a plurality of stators 117. An exemplary generator is disclosed in U.S. patent application Ser. No. 10/973,825, which is hereby incorporated by reference in its entirety. Specifically, the rotor 119 may include an even number of magnets, and each of the stators 117 may include an odd number of coils, wherein each of the coils includes an amorphous core. The amorphous cores do not produce any heat during operation of the electrical generator. Rotation of the rotor 119 may cause the electrical generator to produce an alternating current output to a variable transformer 121, and the output of the variable transformer 121 may be provided to a load 123.

FIG. 18 is a schematic diagram of another exemplary system using the torque converter according to the present invention. In FIG. 18, a plurality of the generator disks 111 may be clustered around and driven by a single flywheel 109, as well as any of the flywheels of FIGS. 1 and 14-16, wherein the generator disks 111 may each be coupled to AC generators similar to the configuration shown in FIG. 17.

The present invention may be modified for application to mobile power generation source systems, as drive systems for application in stealth technologies, as an alternative for variable speed direct drive systems, as drive systems for pumps, fans, and HVAC systems. Moreover, the present invention may be modified for application to industrial, commercial, and residential vehicles requiring frictionless, gearless, and/or fluidless transmissions. Furthermore, the present invention may be modified for application in frictionless fluid transmission systems through pipes that require driving of internal impeller systems. Furthermore, the present invention may be modified for application in onboard vehicle battery charging systems, as well as power systems for aircraft, including force transmission systems for aircraft fans and propellers.

In addition, the present invention may be modified for application in zero or low gravity environments. For example, the present invention may be applied for use as electrical power generations systems for space stations and interplanetary vehicles.

It will be apparent to those skilled in the art that various modifications and variations can be made in the torque converter and system using the same of the present invention without departing from the spirit or scope of the inventions. Thus, it is intended that the present invention covers the modifications and variations of this invention provided they come within the scope of the appended claims and their equivalents.

What is claimed is:

1. A torque converter device, comprising:
a first body having a first radius and a first thickness;
a first plurality of magnets mounted in the first body, the first plurality of magnets including a plurality of magnet pairs, each of the magnet pairs being axially disposed along a centerline of the first body along the first radius through the first thickness;
a second plurality of magnets mounted in the first body, each of the second plurality of magnets being disposed between each of the plurality of magnet pairs; and
a second body having a third plurality of magnets within the second body for magnetically coupling to each of the magnet pairs and the second plurality of magnets,
wherein rotation of the first body induces rotation of the second body.

2. The device according to claim 1, wherein each of the plurality of magnet pairs have polygonal-shaped geometries.

3. The device according to claim 1, wherein a spacing between first and second centerlines of the magnets of the magnet pairs is about equal to a width of the magnets of the third plurality of magnets.

4. The device according to claim 1, wherein the plurality of third magnets includes a first pair of magnets symmetrically disposed along a first centerline of the second body portion.

5. The device according to claim 4, wherein the plurality of third magnets includes a second pair of magnets symmetrically disposed along a second centerline perpendicular to the first centerline of the second body portion.

6. The device according to claim 4, wherein the second body portion includes a plurality of counterweights symmetrically disposed along a second centerline perpendicular to the first centerline of the second body portion.

7. The device according to claim 1, wherein the plurality of second magnets are disposed between a center of the first body and an innermost side of the first plurality of magnets.

8. The device according to claim 7, wherein the plurality of second magnets are axially aligned with the first plurality of magnets.

9. The device according to claim 1, further comprising a first fastening system coupling the first body to a first shaft to rotate the first body about a first axis.

10. The device according to claim 9, wherein the fastening system includes a first shaft backing plate coupled to a major face of the first body and the first shaft.

11. The device according to claim 10, further comprising a second fastening system coupling the second body to a second shaft to rotate the second body about a second axis.

12. The device according to claim 11, wherein the second shaft is coupled to a rotor of an electrical generator.

13. The device according to claim 12, wherein the rotor is disposed between a pair of stators.

14. The device according to claim 13, wherein the rotor includes a first number of magnets and each of the stators include a first number of coils.

15. The device according to claim 14, wherein each of the first number of coils includes an amorphous core.

16. The device according to claim 15, wherein the first number of magnets is different from the first number of coils.

17. An electrical power generating system, comprising:
   a rotational motion source;
   a first body having a first radius and a first thickness, the first body coupled to the rotational motion source;
   a first plurality of magnets mounted in the first body, the first plurality of magnets including a plurality of magnet pairs, each of the magnet pairs being axially disposed along a centerline of the first body along the first radius through the first thickness;
   a second plurality of magnets mounted in the first body, each of the second plurality of magnets being disposed between each of the plurality of magnet pairs; and
   a second body having a third plurality of magnets within the second body for magnetically coupling to each of the magnet pairs and the second plurality of magnets such that rotational motion of the first body about a first axis induces rotational motion of the second body about a second axis,
   wherein the second body is coupled to at least one electrical generator.

18. The system according to claim 17, wherein the rotation includes compressing magnetic fields of the first plurality of magnets using at least one of the second plurality of magnets, and decompressing the compressed magnetic fields of the first plurality of magnets to transfer the rotational motion of the first body to the second body.

19. The system according to claim 18, wherein the compressing the magnetic fields includes placing magnetic field lines of the at least one of a second plurality of magnets within magnetic field lines of adjacent magnet pairs of the first plurality of magnets along a shear plane of the at least one of a second plurality of magnets and the adjacent magnet pairs of the first plurality of magnets.

20. The system according to claim 18, wherein the decompressing the magnetic fields includes disengaging magnetic field lines of the at least one of a second plurality of magnets from magnetic field lines of adjacent ones of the first plurality of magnets along a shear plane of the at least one of a second plurality of magnets and the adjacent ones of the first plurality of magnets.

21. The system according to claim 17, wherein each of the plurality of magnet pairs have polygonal-shaped geometries.

22. The system according to claim 17, wherein a spacing between first and second centerlines of the magnets of the magnet pairs is about equal to a width of the magnets of the third plurality of magnets.

23. The system according to claim 17, wherein the plurality of third magnets includes a first pair of magnets symmetrically disposed along a first centerline of the second body portion.

24. The system according to claim 23, wherein the plurality of third magnets includes a second pair of magnets symmetrically disposed along a second centerline perpendicular to the first centerline of the second body portion.

25. The system according to claim 23, wherein the second body portion includes a plurality of counterweights symmetrically disposed along a second centerline perpendicular to the first centerline of the second body portion.

26. The system according to claim 17, wherein the plurality of second magnets are disposed between a center of the first body and an innermost side of the first plurality of magnets.

27. The system according to claim 26, wherein the plurality of second magnets are axially aligned with the first plurality of magnets.

28. The system according to claim 17, wherein the second body is coupled to a rotor of the electrical generator by a second shaft.

29. The system according to claim 28, wherein the rotor is disposed between a pair of stators.

* * * * *